United States Patent [19]

Montalvo

[11] 4,083,663

[45] Apr. 11, 1978

[54] ROTARY ENGINE WITH PISTONS AND LENTICULAR VALVES

[76] Inventor: Lionel Morales Montalvo, 457 Monserrate St., Havana, Cuba

[21] Appl. No.: 592,775

[22] Filed: Jul. 2, 1975

Related U.S. Application Data

[63] Continuation-in-part of Ser. No. 432,625, Jan. 11, 1974, abandoned.

[51] Int. Cl.² .................... F04C 17/00; F02B 653/08
[52] U.S. Cl. .................................. 418/183; 418/227; 123/232; 123/238
[58] Field of Search ............... 418/183, 188, 191, 192, 418/227, 248

[56] References Cited

U.S. PATENT DOCUMENTS

| | | | |
|---|---|---|---|
| 634,002 | 10/1899 | Kahellek | 418/192 |
| 710,756 | 10/1902 | Colbourne | 418/188 X |
| 1,003,263 | 9/1911 | Humphreys | 123/8.31 |
| 2,794,429 | 6/1957 | Walter | 418/191 |
| 3,261,334 | 7/1966 | Paschke | 418/91 X |
| 3,392,676 | 7/1968 | Bizier | 418/101 X |
| 3,601,514 | 8/1971 | Afner | 418/188 |

Primary Examiner—Carlton R. Croyle
Assistant Examiner—Leonard Smith
Attorney, Agent, or Firm—Haseltine, Lake & Waters

[57] ABSTRACT

A rotary machine with lenticular pistons and valves usable for internal and external combustion engines, expansion motors and pumps. A flat central stator housing is provided with two lateral cover housings. A plurality of rotating elements enclose the interior of the stator housing and rotate on stationary parallel shafts pivoted on bearings inside the cover housing. The parallel shafts are interconnected by a synchronizing gear train which causes the shafts to rotate in one direction and at the same angular speed. A cylindrical central cavity extends in the central stator housing throughout its entire thickness, and intersects smaller cylindrical equidistant surfaces distributed around the periphery. The cylindrical equidistant surfaces contact the cavity by a rotor-piston with lenticular cross section with associated valves also of lenticular cross section and surrounding the rotor-piston. The rotor-piston and rotor valves maintain continuous contact and form hermetic chambers of variable volumes.

1 Claim, 76 Drawing Figures

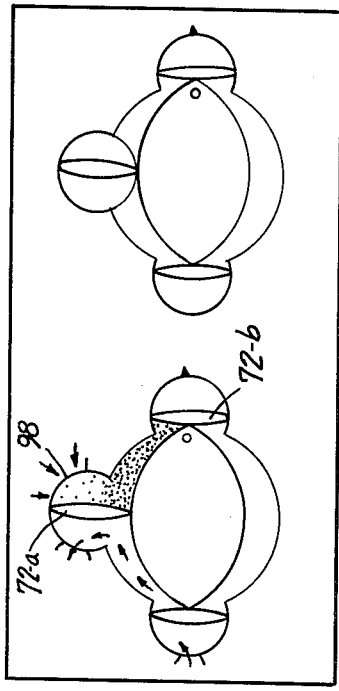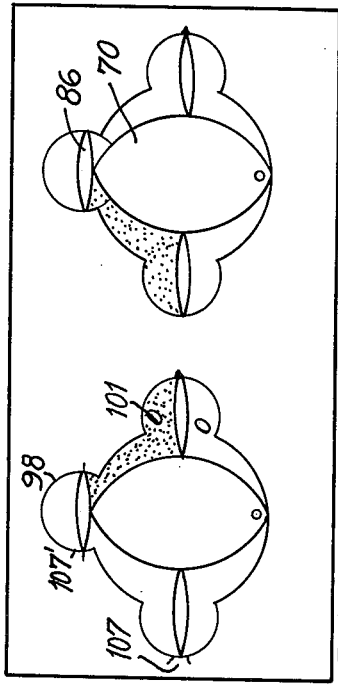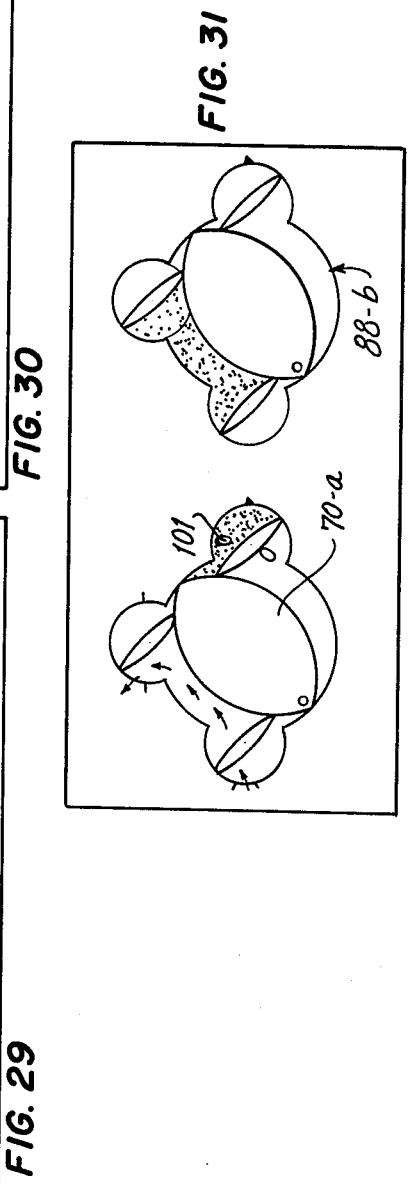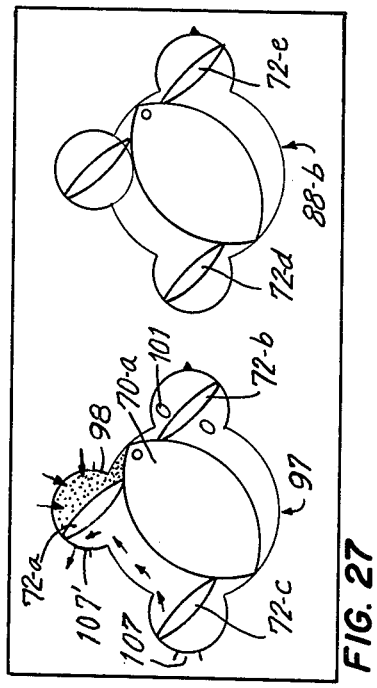

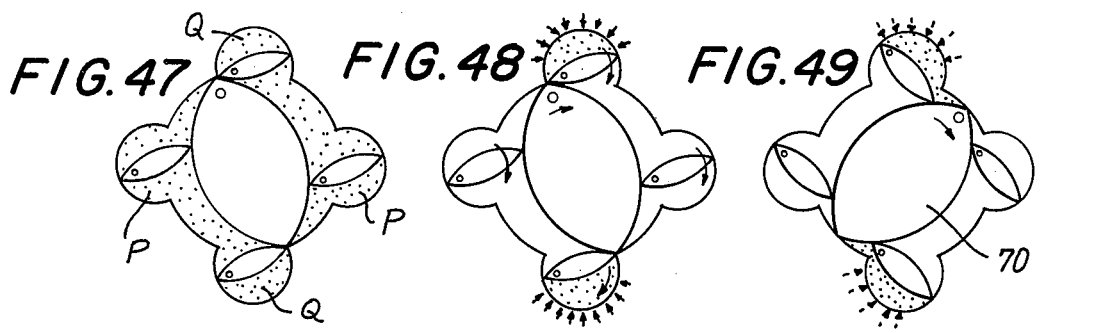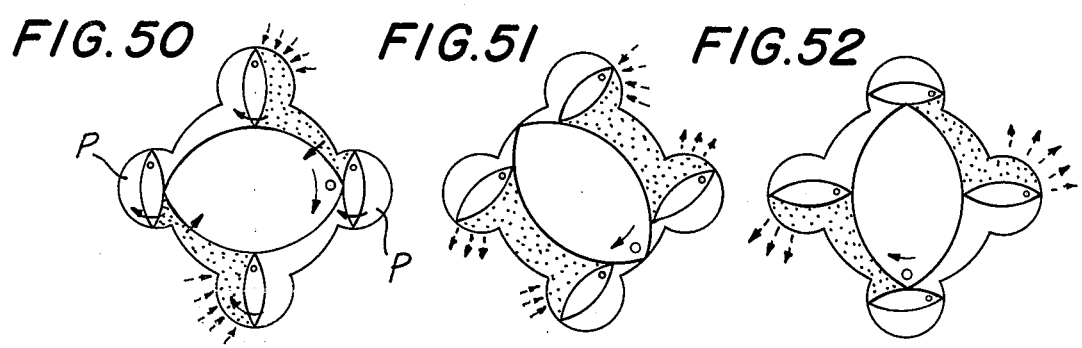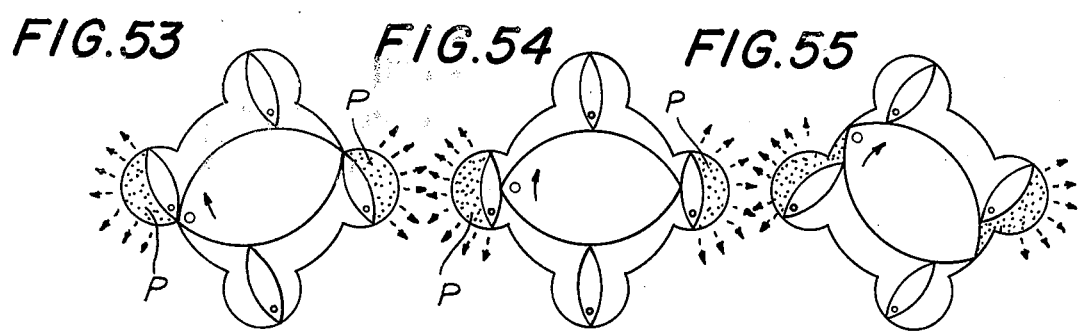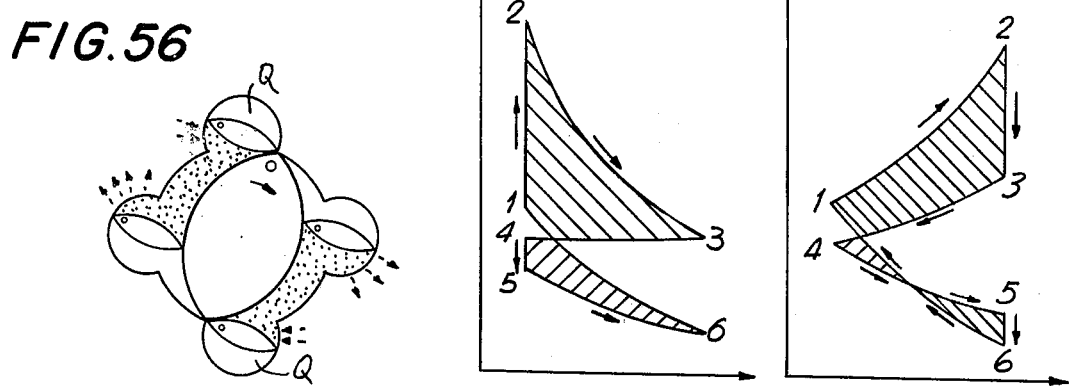

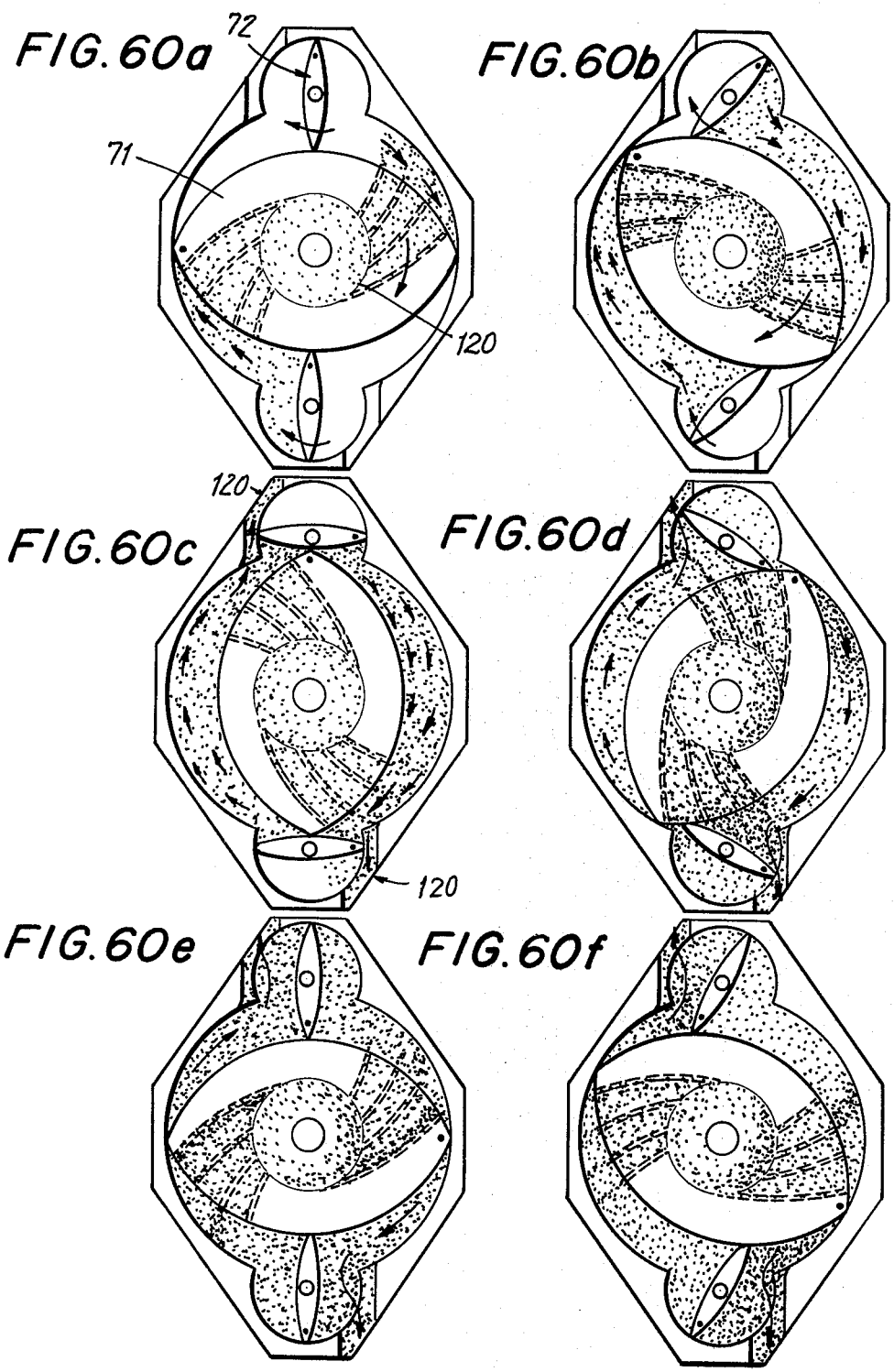

# 4,083,663

ROTARY ENGINE WITH PISTONS AND LENTICULAR VALVES

This application is a continuation-in-part of the parent application Ser. No. 432,625, filed Jan. 11, 1974, now abandoned.

BACKGROUND OF THE INVENTION

This invention relates to a machine in which all moving parts rotate with circular configurations on fixed points the surfaces of which relate to each other by maintaining uninterrupted contact of working surfaces. This engine has applications in numerous branches of contemporary technology, including: the entire range of internal and external combustion engines, new types of compressors, vacuum pumps, blowing machines, fluid pumps and liquid drainage pumps.

Internal combustion engines as well known in the art, transform the chemical energy of fuel into mechanical energy by the use of classical piston-drive shaft-crankshaft systems. Among the disadvantages of these engines are that they entail a considerable number of parts which increase the cost of manufacture and decrease their efficiency and performance. In addition conventional engines cause a considerable amount of pollution agents which are the product of brief combustion time, especially when operating a high speed. Furthermore, one of the problems with internal combustion engines which use spark plugs is that the burn-up process is insufficient and a good part of the fuel entering the combustion chamber is passed out through the exhaust without having been burned up.

Rotary engines are also well known which are based on the principle of the sliding blade pumps; conventional imbedded pistons adapted for longitudinal and rotary movement; orbital alternating motors and motors with triangular pistons which move within epitroidal surfaces. All of these designs, however, have the disadvantages of incomplete combustion and expansion.

The engine disclosed in U.S. Pat. No. 2,794,429, emphasizes the inherent differences in its principles, and these differences are translated into the moving elements of the engine basically including two lobular rotors in the form of unequal flattened point ovals which rotate in the same direction and at the same speed without any contact between them at any time. They also do not have any contact between them and the walls which partially surround them.

The lobes rotate in accordance with the turbine blade principle, that is to say: without sealing contact of any kind, which suggests the impossibility of executing sufficient compression. In addition, this machine requires, for its operation, the action of a blower machine at the intake, and a turbine at the outlet, to take advantage of the great pressure and temperature at which the gases are expelled, into the outside atmosphere.

SUMMARY OF THE INVENTION

Accordingly, the primary object of the present invention is to avoid the disadvantages of conventional engines by providing an internal combustion engine with improved conditions under which the combustion develops, by accomplishing combustion in a constant volume hermetic chamber, with ignition from a filament-bar which remains incandescent during the operation of the engine. The intermittance of the sparkplug is avoided and complete combustion of the mixture is made possible at high speeds. The engine also provides for compression and expansion processes in absolutely airtight variable volume chambers. Included are improvements such as post-combustion with full benefit of energy, automatic temperature control of the combustion and total expansion of the gases. This eliminates the need for a muffler, thus resulting in a substantial increase in thermal yield.

All of the above-mentioned advantages provide an exhaust practically free from pollution agents.

Another object of this present invention is to furnish a small motor for internal combustion, also with constant volume, with the same characteristics as the motor described above, but with normal expansion and without post-combustion. This notably simplified version, air-cooled, of little weight and reduced volume is adaptable as a driving mechanism of low capacity for light vehicles, such as small boats, scooters, motorbikes and similar.

In spite of the advantages achieved by the turbine reactors and the turbine drivers in their functions at high altitudes and speeds, offering extremely powerful units of relatively little weight and reduced frontal area, the applications of reciprocating aviation engines have not been abandoned. This is mainly due to their great thermal yield with relation to the former. It is well known that a reciprocating piston engine can never achieve the smoothness of operation of a perfectly balanced rotating mechanism, nor can it achieve the rotational speeds similar to the turbines. It is also well known that the capacity and power delivered by any thermal motor depends basically on the maximum quantity of air it can utilize. In aviation, up to the present time, the reciprocating motors have been advisable in order to handle relatively small volumes at high pressure and temperature. The turbines because of their high yield and performance and large flow pass sections, are the best for large volumes at low pressures.

The purpose of this present invention is to offer a new thermal engine concept for the aeronautical industry which can handle large volumes of air at high pressure and temperature, with ample passage of constant flow in practically continuous combustion at a high rate of speed without the slightest vibration.

In accordance with the present invention, the motor is a double action engine with balanced stresses which avoid the lateral tensions that tend to deform the shaft and overload the supports of said shaft. It is air-cooled and capable of silent operation with an extensive range of fuels, offering weight-capacity-volume ratios with higher executions than those of the turbine-drivers. Such an engine offers greater fuel economy than the reciprocating motors and the mounting of several units on the same shaft is possible.

Known in the art are external combustion engines to which heat is applied from an outside source to a gas enclosed within a hermetic circuit. When this gas expands, it moves the reciprocating pistons which transmit force to the output shaft by means of the classical drive-rod-crankshaft mechanism or also by means of sophisticated mechanisms such as oscillating plates or rhomboidal drag. The gas enclosed in the hottest part accomplishes the expansion and withdraws into the coldest area depositing heat in an intermediate regenerator. When returning toward the expansion zone, it recovers the heat in order to recommence the cycle. Combustion is accomplished outside of the cylinder in a continuous process, in specially designed burners with their own air, considerably reducing the production of pollution agents. However, this conversion of thermal energy into mechanical energy is inefficient, and the engine is subject to the inconveniences of reciprocating operation which, in addition, has to overcome the forces of friction produced by a numerous network of narrow ducts constantly obstructing the displacement of gas.

Another purpose of this present invention consists of providing an external combustion engine which achieves direct conversion of the thermal energy into rotating mechanical energy, by moving the work mass in a single rotating direction, in which a six speed cycle is executed. This cycle is produced in a semirevolution, so that the motor operates at the rate of two cycles per turn, producing symmetrical forces which provide the output shaft with such a degree of compensation that the machine is perfectly balanced. The engine also provides for achieving a system of maximum hermetic closure.

A pump as used in the art has the inherent features of compressing or aspirating a fluid by mechanical or other means. On this basis, there is commercially available a very extensive range of manufactured items, such as positive displacement pumps and non-positive displacement pumps. To the first group belong the volumetric pumps, which can be of the piston or rotating type. In general, they are mechanisms which modify the energy of the fluid by increasing its pressure, and they are not associated with the dynamic effect of such fluid. The second group is basically composed of the centrifugal pumps and those with propeller or helix and axial rotors, which modify the kinetic energy of the fluid, and transform it into pressure energy.

The present invention has as its objective and purpose, to unite in one pump the basic characteristics of the two main aforementioned groups, in such a manner that the new pump modifies the energy of the fluid by elevating its pressure due to a variation in volume equivalent to the displacement of the mechanical element which transmits the displacement energy and, at the same time, it modifies the kinetic energy of the fluid, to transform it into pressure energy. A new feature of the pump of the present invention consists of its balanced function, produced when symmetrical forces operate on the shaft, and originate in chambers opposite each other, to avoid the lateral stresses on the bearings. One type of such pump, which joins the advantages of both groups without introducing their defects, leads to an innovative device which incorporates some totally new characteristics in the art of the handling of fluids by means of machinery.

The expansion motors, both air and vapor, encompass at the present time, a vast field of utilization, where the reciprocating pistons are used mainly in addition to those with sliding blades. It is therefore another object of this invention to provide an expansion engine with a completely new principle of operation which improves on the previous ones by receiving the fluid in discreet amounts at constant volume in order to expand it totally over a mechanical element in rotation and, in this way, obtains maximum efficiency. This machine also provides for the balancing of lateral forces which avoids the deformation of the shaft that results in vibration and overloads the bearings.

A final object of the present invention consists of providing the method of geometrical construction of rotor shapes related by the same circumferential arc, determined, in turn, by two other orthagonal circumferences selected arbitrarily.

The novel features which are considered as characteristics for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 22a is a side view of the internal combustion engine with total expansion;

FIG. 24 is a sectional view taken along line A—A in FIG. 22a;

FIG. 25 is a sectional view taken along line B—B in FIG. 22a;

FIG. 26 is a sectional view taken along line C—C in FIG. 22a;

FIGS. 27–41 are schematic views and show progressive stages of operation of the internal combustion engine with total expansion of FIG. 23;

FIGS. 47–56 are diagrammatic views and show progressive operational stages of the external combustion engine of FIG. 46;

FIG. 57 is a pressure-volume graph of a six step cycle of the external combustion engine of FIG. 46;

FIG. 58 is a temperature-entropy graph of the six step cycle of the external combustion engine of FIG. 46;

FIGS. 60a–60f are diagrammatic views and show progressive operational stages of the mixed displacement pump during operation;

DESCRIPTION OF THE PREFERRED EMBODIMENTS

All of the machines, to be described in accordance with the present invention, are fundamentally based on the practical application of the new theorem expressed as follows:

When two orthogonal circles are caused to rotate in the same direction and at the same angular speed, the end points of their respective perpendicular diameters alternately trace four arcs which form two lenticular normal configurations among themselves and which will rotate uniformly while being in constant contact.

Figure 1:
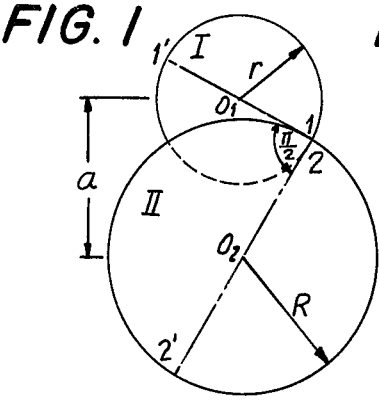
FIGS. 1–12 are diagrammatic views and show the principle of operation forming a basis for the present invention.
Figure 12:
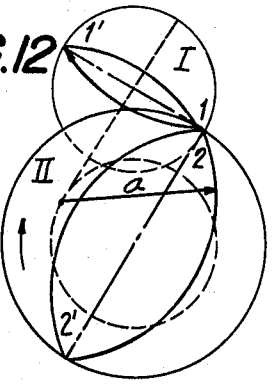

The graphic sequence which commences in FIG. 1 and ends in FIG. 12, demonstrates the generation process of the isometric moving lenticulars given three parameters: Major Radius "R", minor radius "r" and the distance between centers "a" with the kinematic process taking place as follows:

FIG. 1.— Shows the initial position of the orthogonal circles or circumferences I and II on a plane, with the perpendicular diameters being the straight lines 1—1' and 2—2'.

Figure 2:
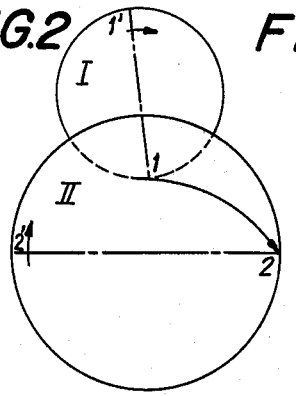
Figure 3:
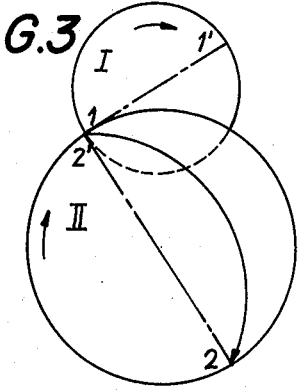

FIGS. 2 and 3: One point 1 of the circumference I traces a line on circle II forming a curve of radius "a".

Figure 4:
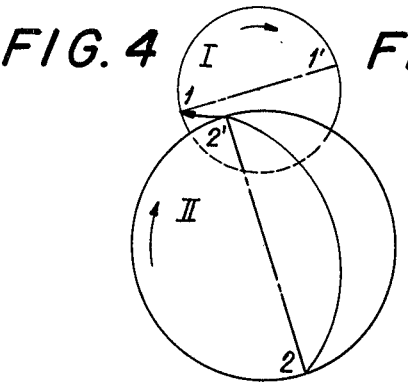
Figure 5:
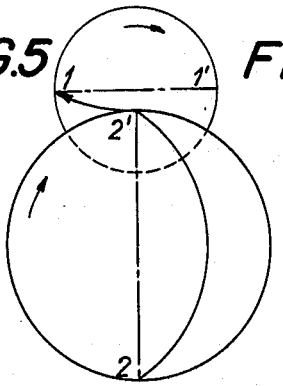
Figure 6:
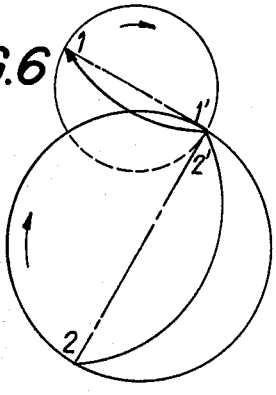

FIGS. 4, 5, and 6: Now a point 2' of the circumference II traces on the circle I another arc of radius "a".

Figure 7:
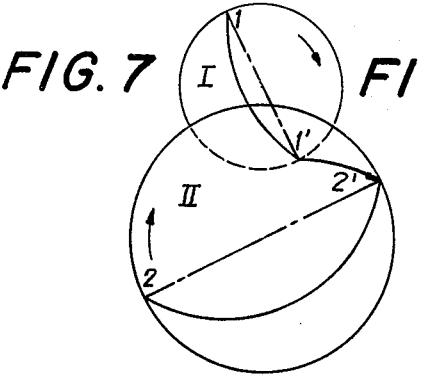
Figure 8:
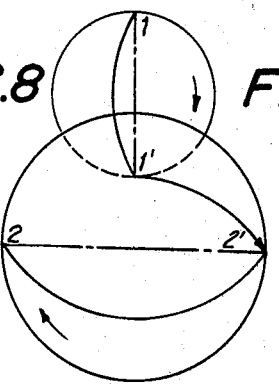
Figure 9:
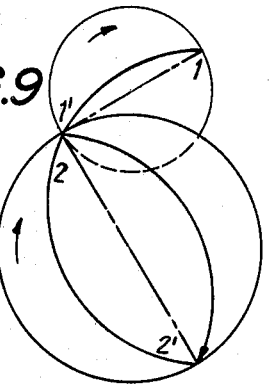

FIGS. 7, 8, and 9: Again, another point 1' of the circumference I traces another arc of radius "a" on circle II completing a lenticule.

Figure 10:
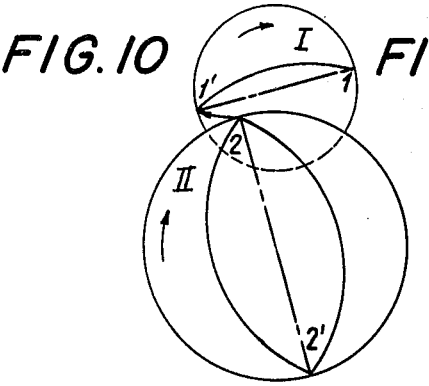
Figure 11:
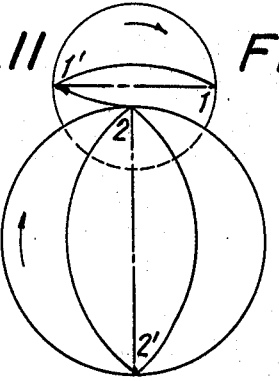

FIGS. 10, 11, and 12: Finally, point 2 of the circumference II completes, with another arc of radius "a", the other lenticule on circle I.

Figure 13:
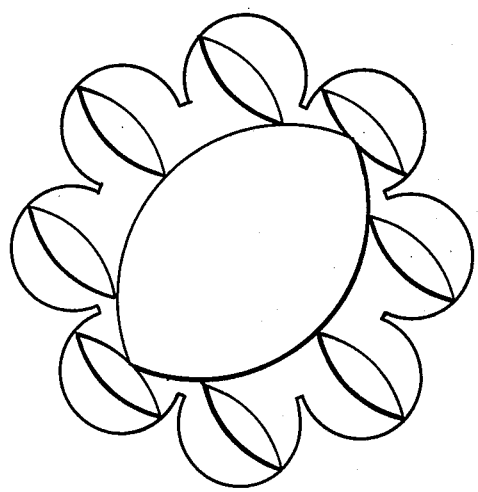
FIG. 13 is a schematic elevational view and shows an application of the principle illustrated in FIGS. 1–12.

FIG. 13: Demonstrates an extension of the theorem in which the coupling of various minor lenticules on one major one is repeated.

Figure 21:
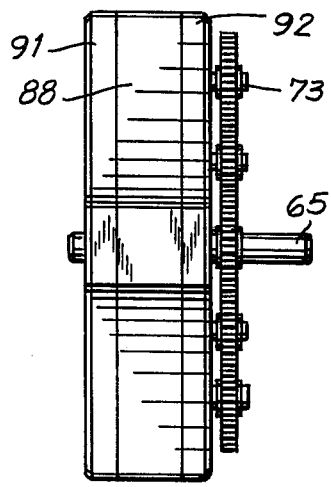
FIG. 21 is a side view of the basic machine of the present invention.
Figure 22:
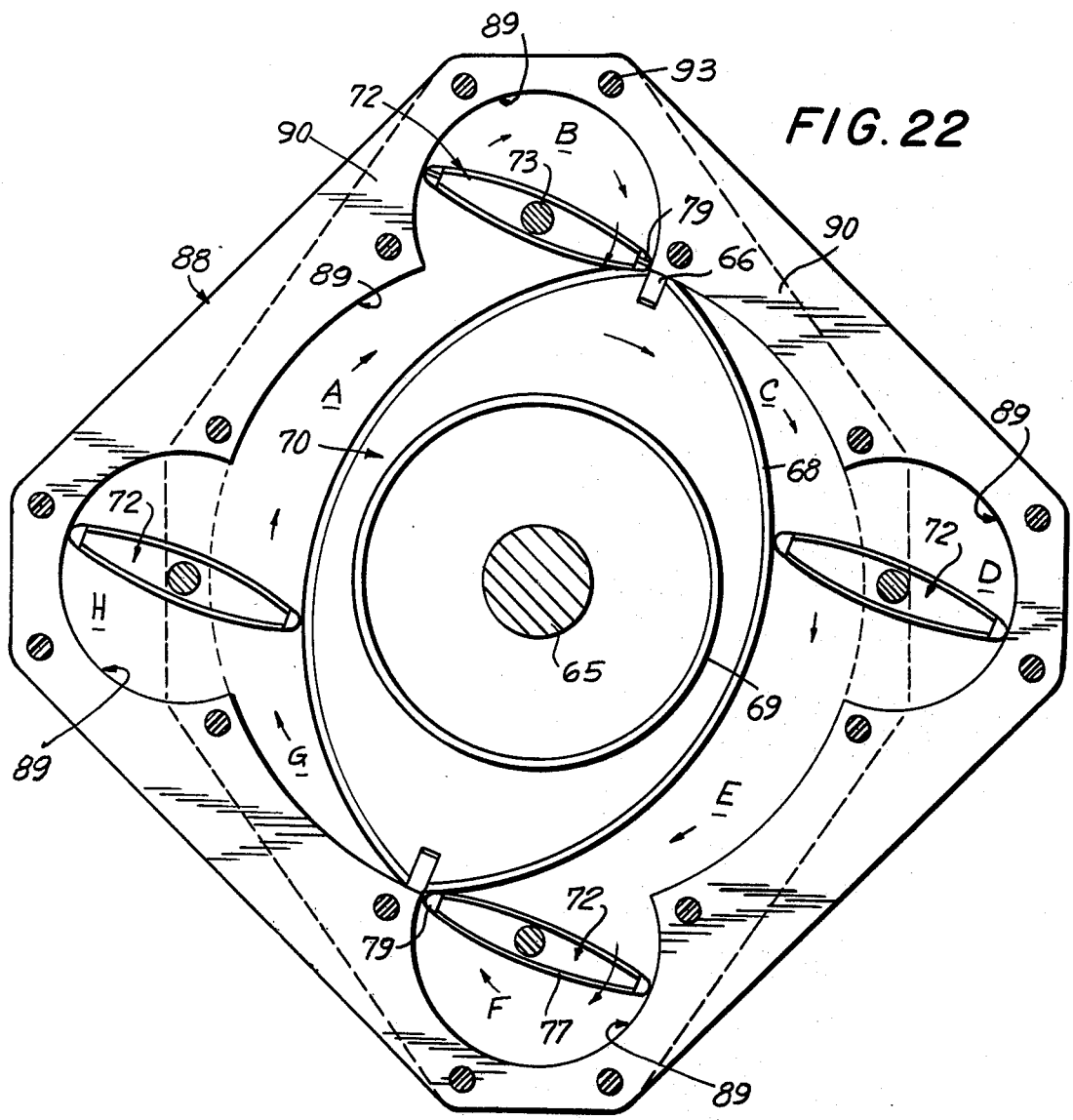
FIG. 22 is a front view of the housing of the machine of FIG. 21.

FIGS. 21 and 22 illustrate a general aspect of the fundamental machine of this invention, which consists of a device working in cycles with compressible fluids and is capable of aspirating, compressing and moving internally discreet portions of the fluids, supplying them with heat or taking away heat from them, and, in addition, can expand or expel them or recirculate them indefinitely while thermodynamic processes are being carried out. If the machine handles a non-compressible fluid, it is capable of aspirating it, raise its pressure, recirculate it and expel it. In all cases, the machine can have the intake ports (not shown in this figure) at various peripheral points, or annular intakes laid out around shaft 65, with the result that rotor 70 becomes replaced with expelling rotor 71, which appears in FIG. 16. The expulsion ports (not shown) can also be placed at peripheral points, as will be demonstrated further on, when the specific machines are described and shown in detail.

In FIG. 22 and subsequent figures, reference numeral 88 designates a stator with a central cavity formed by the intersection of various cylindrical surfaces 89 carefully machined, and flat lateral faces 90, adjacent to the lateral housings 91 and 92 as shown in FIG. 21. Bolts are distributed in the holes 93.

In contact with the cylindrical surfaces 89 and the aforementioned covers 91 and 92 are a multitude of lenticular rotors 70 and 72 which rotate on the fixed shafts 65 and 73, distributed as shown in FIG. 22. These multitude of lenticular rotors comprise the movable elements of the machine and they synchronize their movements by means of exterior gear train 94; FIG. 21 (and FIG. 26), in order to rotate in the same direction and with the same angular speed in proper kinematic relationship as described in FIGS. 1–12. When the aforementioned rotors 70 and 72 rotate in the same direction they move the work substance in the direction of the arrows, transferring it from one chamber to another in a continuous stream, so that the hermetic volumes represented by A B C D E F G and H vary their dimensions while they move around the major rotor 70.

Figure 14:
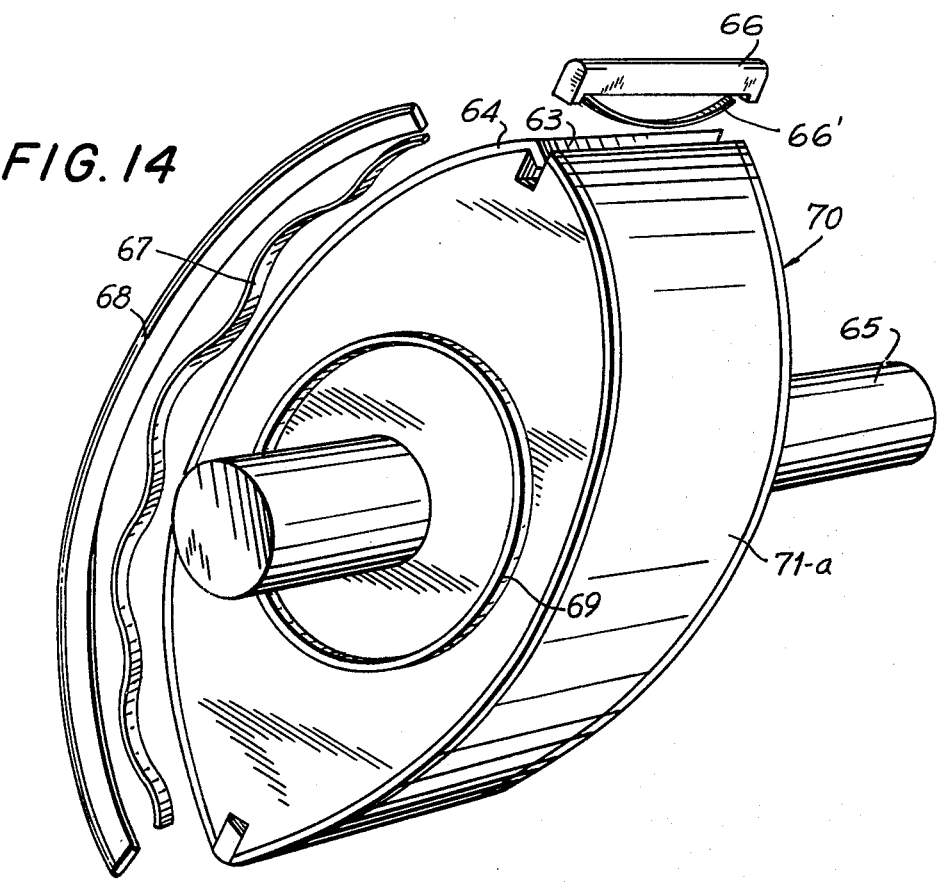
FIG. 14 is a perspective view and shows the construction of a rotor-piston used in the machine in accordance with the present invention.
Figure 15:
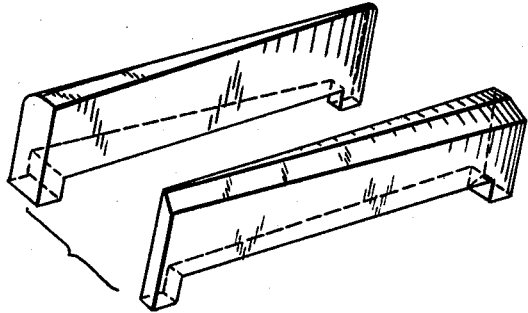
FIG. 15 is an isometric view and shows a seal associated with the rotor-piston of FIG. 14.

Details are given below, particularly, of each one of the basic components which comprise this Fundamental Machine. The rotor-piston 70 shown in FIG. 14 consists of a single-piece number which is dynamically balanced, and is of lenticular cross-section formed by two cylindrical surfaces 71-a generated in accordance with the description of FIGS. 1–12, and parallel flat sides. This rotor 70 provides channels to lodge the sealants of wipers 66 and the bowed segments 68. The wiper, shown in detail in FIG. 15, consists of two cuneiform sheets placed in such a manner that they form a flat face plate with the top edge of the friction surface of the cylinder. Between the plates there should be a flow of a light film of oil which facilitates relative movement to accomplish the sealing function on three sides and simultaneously lubricate the friction surfaces.

Spring 66' maintains sufficient pressure between the seal and the surface 89, while permitting relative movement with respect to slot 63. The curved segment 68 (FIG. 14) given thrust by the wavy spring 67 creates friction with its flat side on the inside faces of the lateral covers 91 and 92. Its curved side follows the profile of rotor 70, to be contacted by the wipers 79 of the rotor valves 72 during operation.

From the flat sides of rotor-piston 70, the rings 69 are inserted on the springs located in the bottom of the channels laid out concentrically around shaft 65. Through these the energy which the machine receives or delivers is taken in or expelled. All of the aforementioned elements 68, rings 69, and wipers 66 form part of the sealing device required to hermetically close the variable volumes where the work substance is processed.

Figure 16:
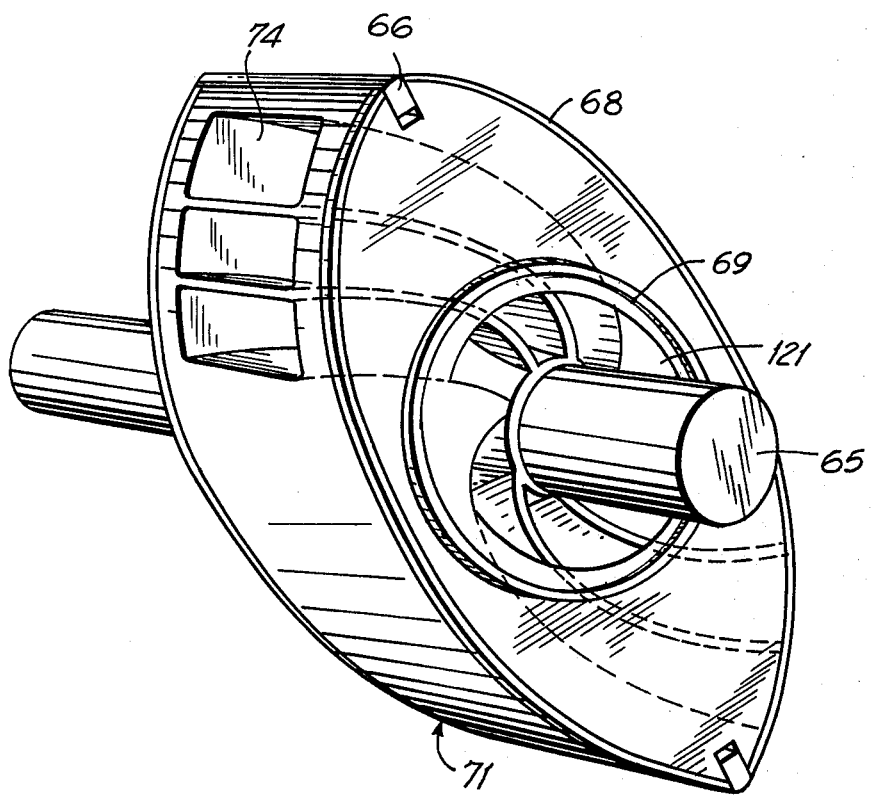
FIG. 16 is a perspective view and shows the construction of an expelling rotor-piston, in accordance with the present invention.

The rotor-piston 70 variation, shown in FIG. 16, consists of an impeller rotor-piston 71, with inside channelling 74 in the form of spiral boxes or symmetrical volutes which incorporate in the rotor-piston an additional impeller function when the machine works as a pump for mixture displacement. The explanation of this operation will be given subsequently.

Figure 17:
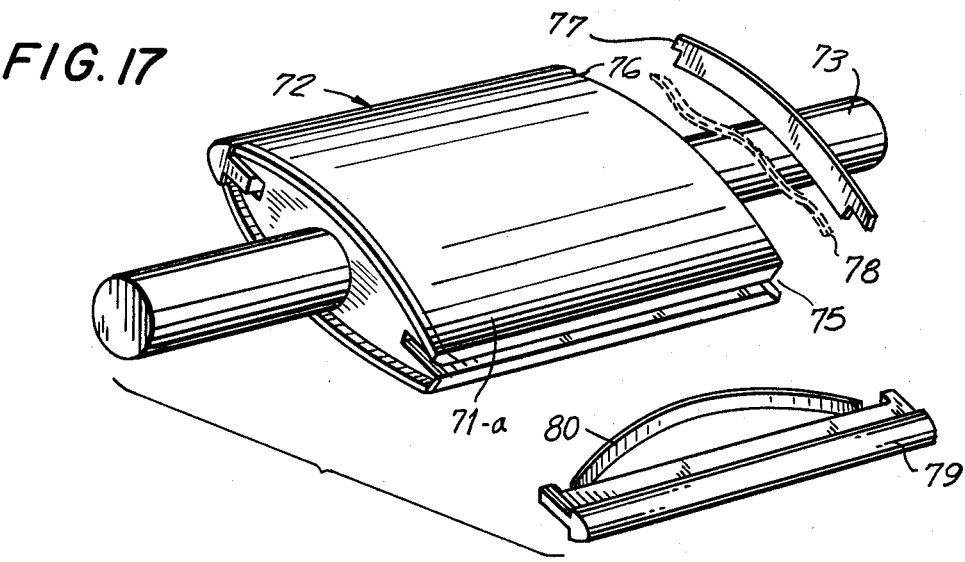
FIG. 17 is a perspective view and shows the construction of a simplified rotor-valve associated with the rotor-piston.

The rotor-valve 72 shown in FIG. 17, consists of a single-construction part generated also by two cylindrical surfaces 71a and ending in two lateral flat faces. All of its salient surfaces are channelled in order to house the seals 79 with their springs 80 and the curved segments 77 with their springs 78.

Figure 18:
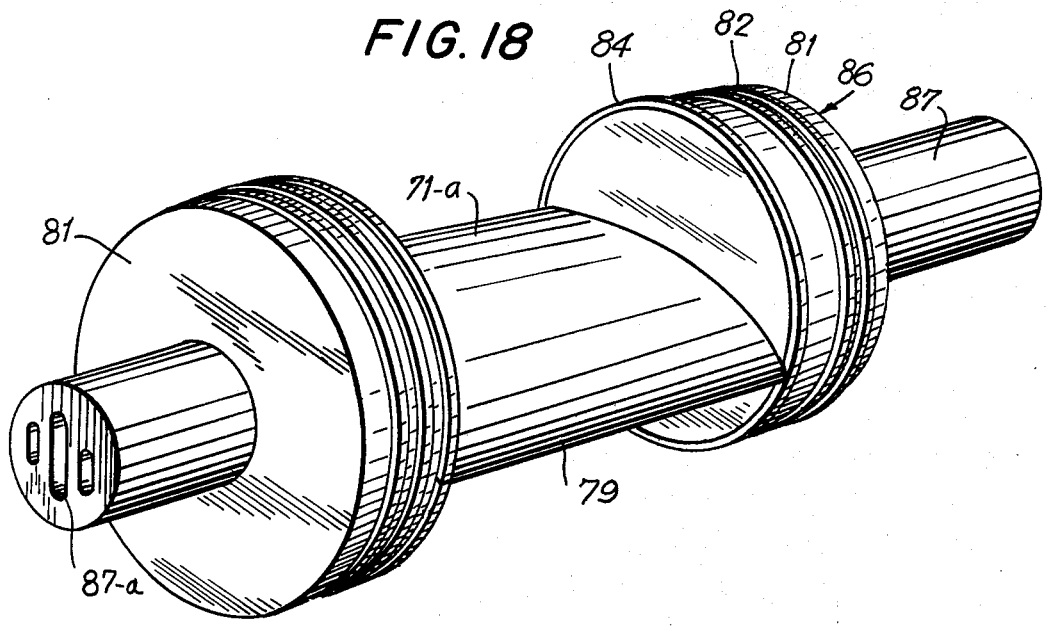
FIG. 18 is a perspective view and shows the construction of a combustion rotor-valve.
Figure 20:
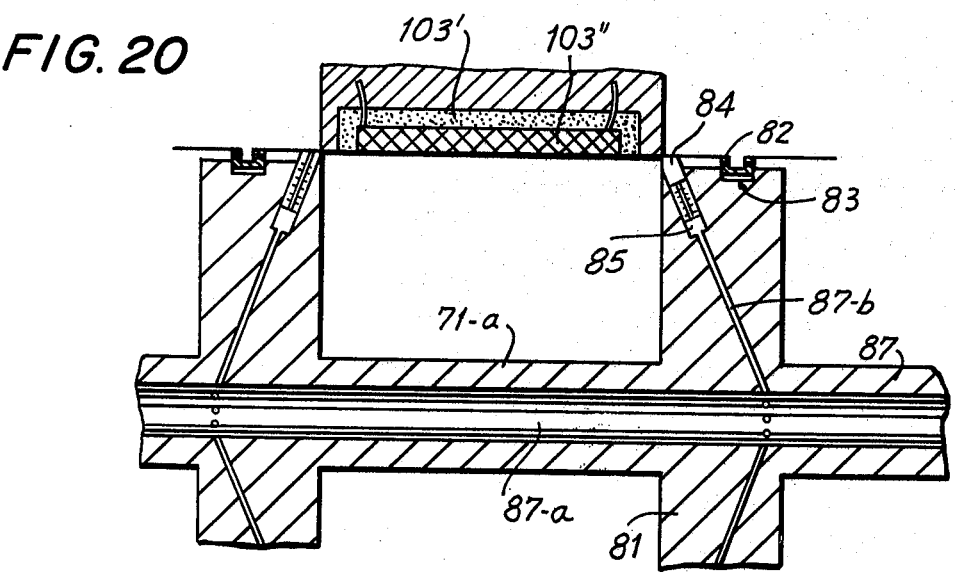
FIG. 20 is a sectional view of the combustion chamber of the present invention.
Figure 23:
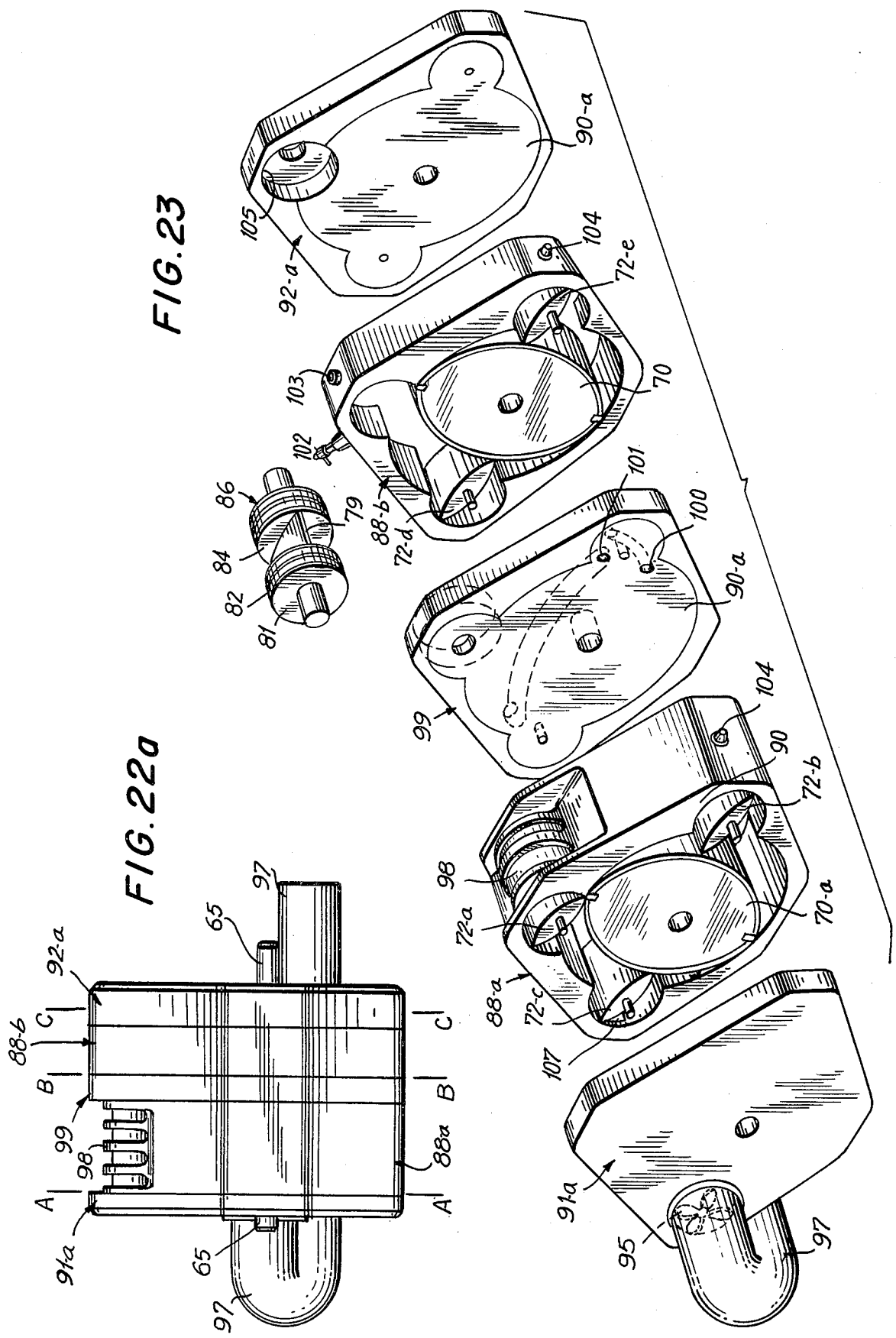
FIG. 23 is an exploded view of the internal combustion engine with total expansion.
Figure 24:
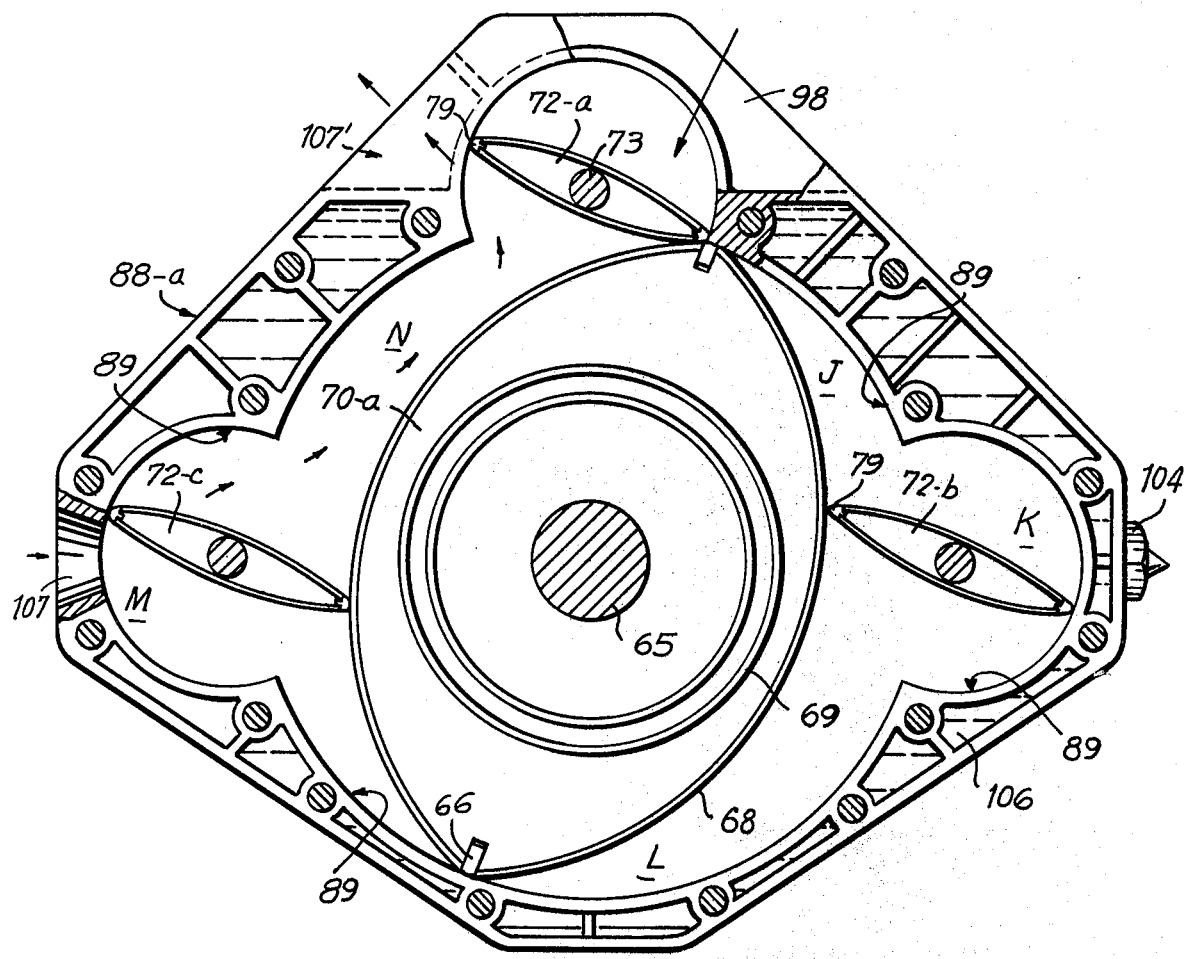

When said rotor-valve operates in the combustion chamber it is constructed with two lateral cylindrical disks 81 (FIG. 18). These disks will have channels 85, to support the semi-circular segments 84, which are constructed and operate similar to the segments 68. On these lateral disks 81, furthermore, are inserted rings 82 to which pressure is applied by springs from the bottom of channel 83 (FIG. 20). The new combustion rotor-valve identified with reference numeral 86 (FIGS. 18 and 20) comprises a single construction part, dynamically balanced, and with a multitude of inside channels: axial 87a and radial 87b and 87c, (FIG. 25) which establish a circulation of cooling-lubricating oil over the rings and segments. The shaft 87, mounted on suitable bearings serves as a means to synchronize the movement of gear train 94. Both the segments 84 as well as the rings 82 will cause friction on the cylindrical surfaces 105, included in the lateral covers 99 and 104, which are extensions of the surface 89 as shown in FIG. 23.

Figure 19:
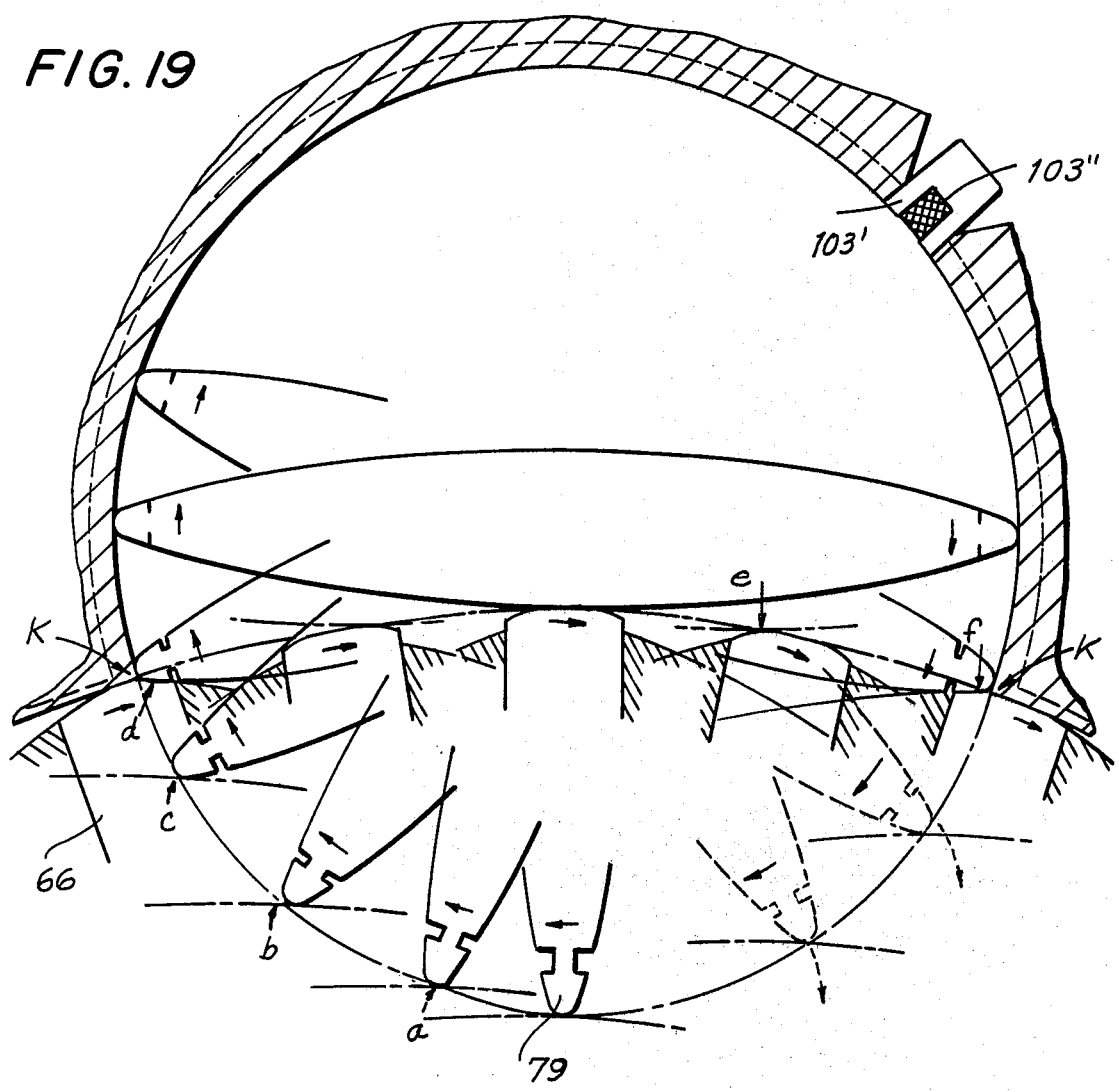
FIG. 19 is a kinematic graphical representation and shows the relationship between the sliding surfaces of the present invention.

FIG. 19 shows a cross-section of the combustion chamber and shows the surface changes between the rotor wipers. The arrows a, b, c, and d indicate the curved surface of the rotor-piston 70 as it applies thrust to wiper 79 as the wiper approaches vortex K to change sliding surfaces. Commencing with this point, it is wiper 66 which slides over the curved surface of the valve; and it is this surface which, later, pushes wiper 66, as indicated by the arrows e and f, in order for it to effect a change in surfaces at point K'.

On the dome of the combustion chamber, there is shown a cross-section of an igniter 103. A ceramic capsule 103' envelopes the bar-filament 103", slightly withdrawn in order to avoid contact with wiper 79. This bar-filament 103" is an electrode which remains incandescent and is capable of provoking complete ignition of the portions of the mixture which cross in front of it when moved by the rotor-valve. FIG. 20 shows a longitudinal section of igniter 103.

This construction which simplifies the seals by using very thin friction wafers, gives a helicoidal form to the rotor. It improves markedly the passage of the seals or wipers of the fixed surfaces of the stator and the moving surfaces of the rotors, as well as the intake of the aforementioned seals from the moving finned surfaces of the rotors toward the fixed cylindrical surfaces of the stator. This passage is accomplished in a smooth, silent manner, without the slightest possibility of shock, and this allows the aforementioned machines of this invention to attain rotation speeds of more than 10,000 r.p.m.

The pair of helicoidal rotors, nevertheless, maintain the principle of the aforementioned theorem so that each parallel section of the flat faces in any point of thickness will always provide two lenticular configurations perpendicular to each other.

Figure 19A:
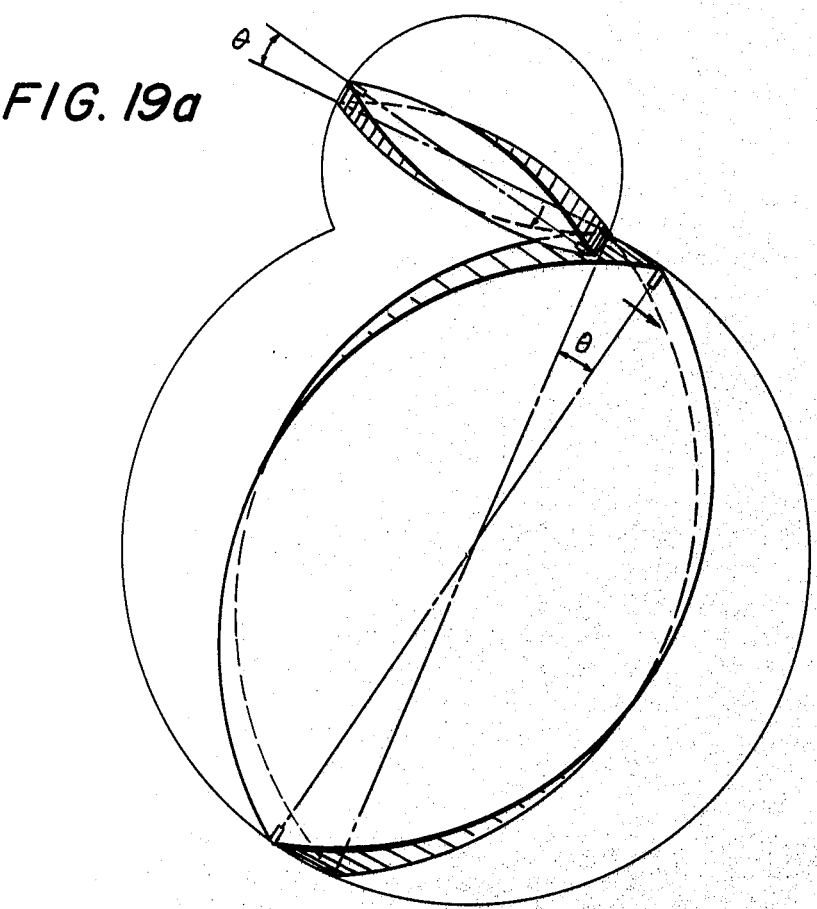
FIG. 19a is a schematic view and shows the construction of a finned or helicoidal rotor.
Figure 19B:
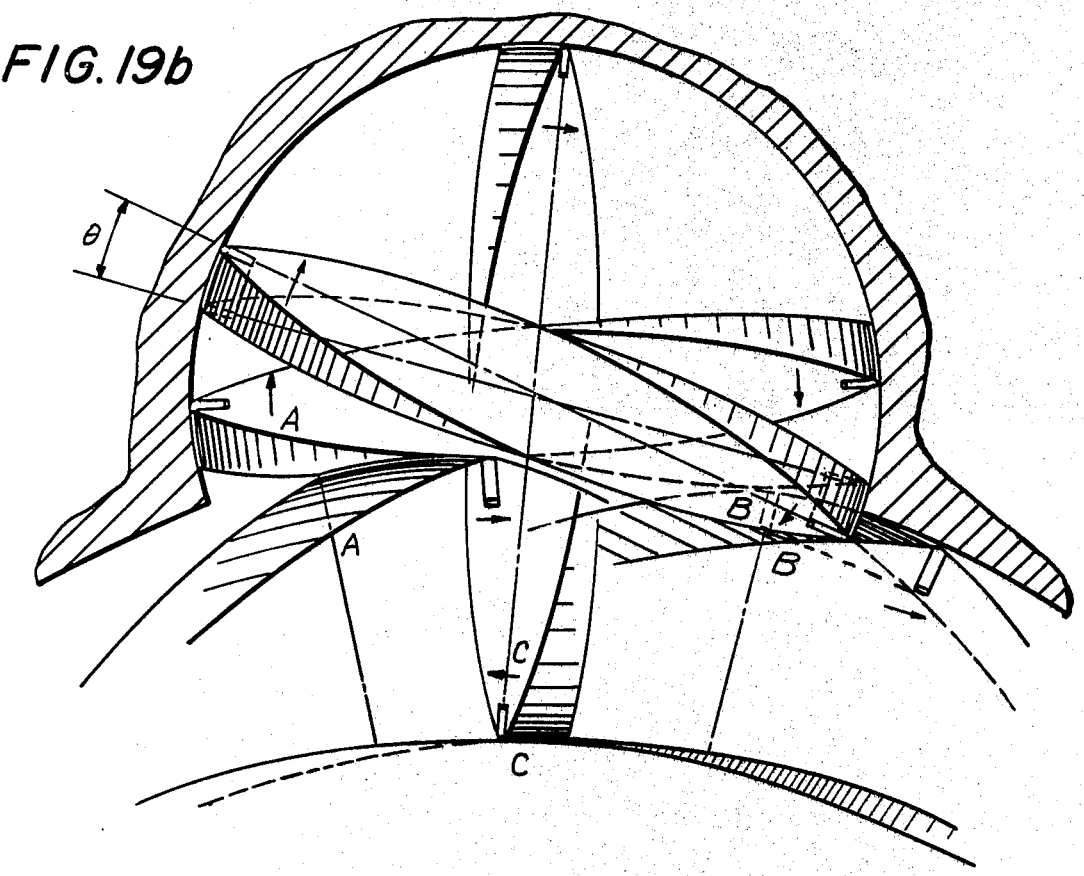
FIG. 19b is a kinematic graphical representation of a bladed rotor.

In FIG. 19b, three positions are shown for the conjugated rotors: in A, the major rotor slides its wiper over the bladed surface of the smaller rotor; in B, the simultaneous passage is shown of the wipers of both rotors when passing from one surface to the other; the seal of the smaller rotor in that instant is leaving the cylindrical surface of the stator. It supports itself also on the bladed surface of the larger rotor, that is to say, it goes from the stationary surface onto the moving surface. The larger rotor, on the other hand, passes from the moving surface onto the stationary surface, and the graphic representation shows its momentary stay on both surfaces.

Position D shows the passage of the smaller rotor seal over the bladed surface of the larger rotor in its inflexion point.

Upon eliminating the lower valve 72 from the basic machine of FIG. 22, having available two parallel housings with rotor pistons mounted on the same shaft and locating conveniently, the intake and outlet ports, the machine is converted to an internal combustion engine of constant volume with double expansion and post combustion at the end of the first expansion, as shown in FIG. 23.

The motor functions practically without emission of noxious gases, by obtaining complete combustion of the mixture in a rotating chamber at constant volume, with combustion time as a fixed factor of the design parameter. The pressures attained in the chamber can be very high and capable of reducing the effects of disassociation of the components $CO_2$ and $H_2O$ formed by the combustion. When recirculating toward the chamber, automatically, in the form of a portion of the first expansion gases, it diminishes the combustion temperature and reduces the production of nitrogen oxide.

The motor also possesses another combustion chamber of low temperature which eliminates by thermal reaction any residue without adding $NO_X$.

One of the properties of the motor in its geometric development, is that, when duplicating the diameter of the stator, the capacity is quadrupled. Taking full advantage of the available energy obtained when effecting total expansion and eliminating the silencer attached, has not been achieved by any thermal motor to the present time. Moreover, on the inside of the motor of the present invention, no carbon deposits are accumulated nor any other residue. It also functions silently with any type of fuel, eliminating the phenomena of self-ignition and detonating combustion.

In FIG. 22a, there is a side elevation view of the aforementioned motor, showing the sandwiched coupling of the two housings which form it and showing cross-sections A—A, B—B and C—C which will be detailed subsequently. FIG. 23 is a schematic of the main housings, without shaft 65 and the cooling devices.

Housing 91a consists of a cover with inside channelling having ducts (not shown) for the circulation of cooling and lubricating fluids. Suitable cavities are provided to house the shaft support bearings and with a front outlet in the form of an elbow-shaped duct 97 which supports ventilator 95. The latter forces out the exhaust gases. The intermediate housing 99 consists of a bulkhead with flat parallel faces with friction paths 90a on both sides. This bulkhead contains, in addition to the lubrication, cooling and shaft support systems, an air transfer tunnel whose intake 101 allows passage of air from the intake chamber of the auxiliary rotor-piston 70a in the direction of the compression chamber of the rotor-piston 70. Under the intake 101, the tunnel outlet 100 is shown as a diabatic tunnel through which the first expansion gases flow toward the post-expansion chamber under the rotor-piston 70a.

Section A—A, FIG. 22 shows section A—A in FIG. 22a schematically to provide the placement of the moving elements already explained, as well as intake mouth 98 and the lateral port 107, through which the fresh air will penetrate to cool the rotor 70a, and will then pass out through the port 107'. Reference numeral 104 identifies the purge valve regulated to work at intervals by means of electrical impulses. It is the function of the valve to control the quantity of air or gas to be recirculated toward the combustion chamber and the post-combustion chamber.

Figure 25:
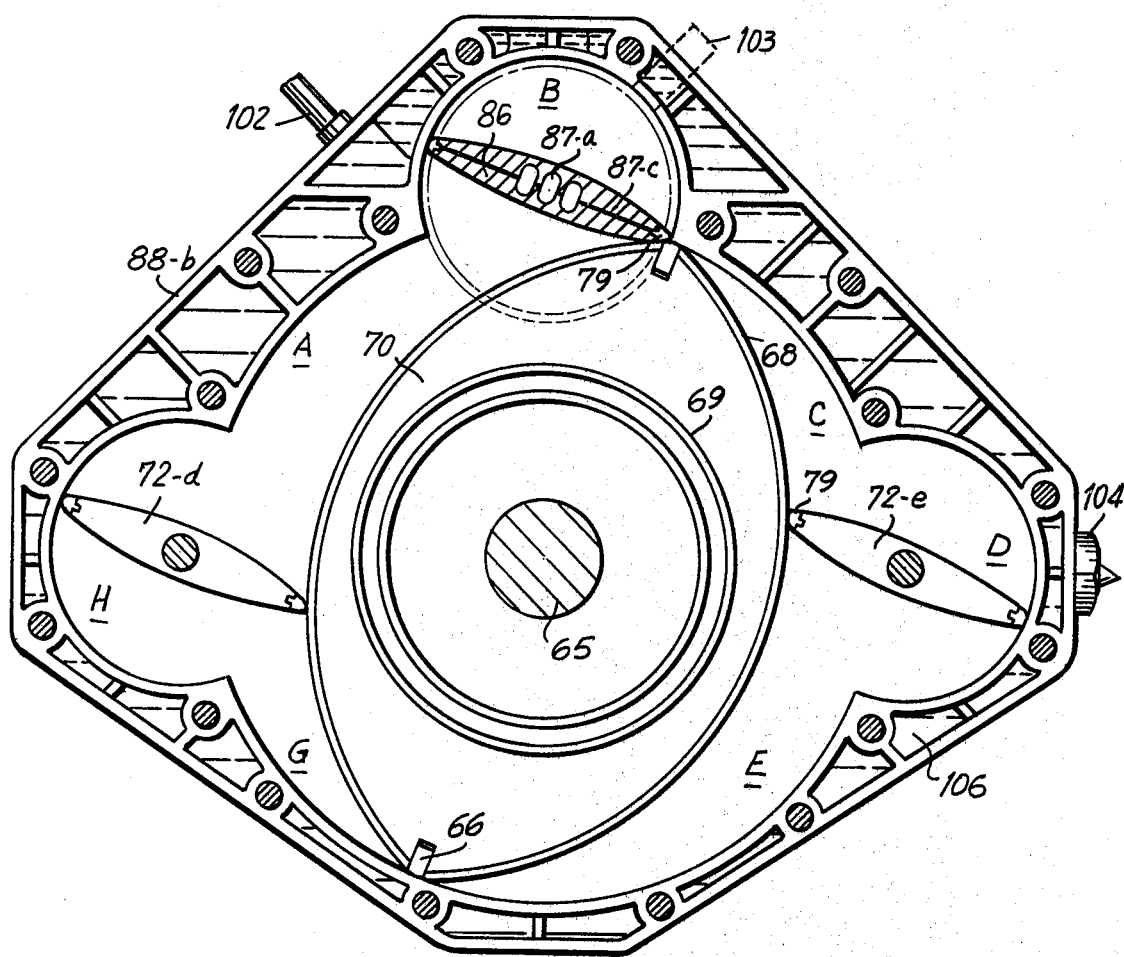
Figure 26:
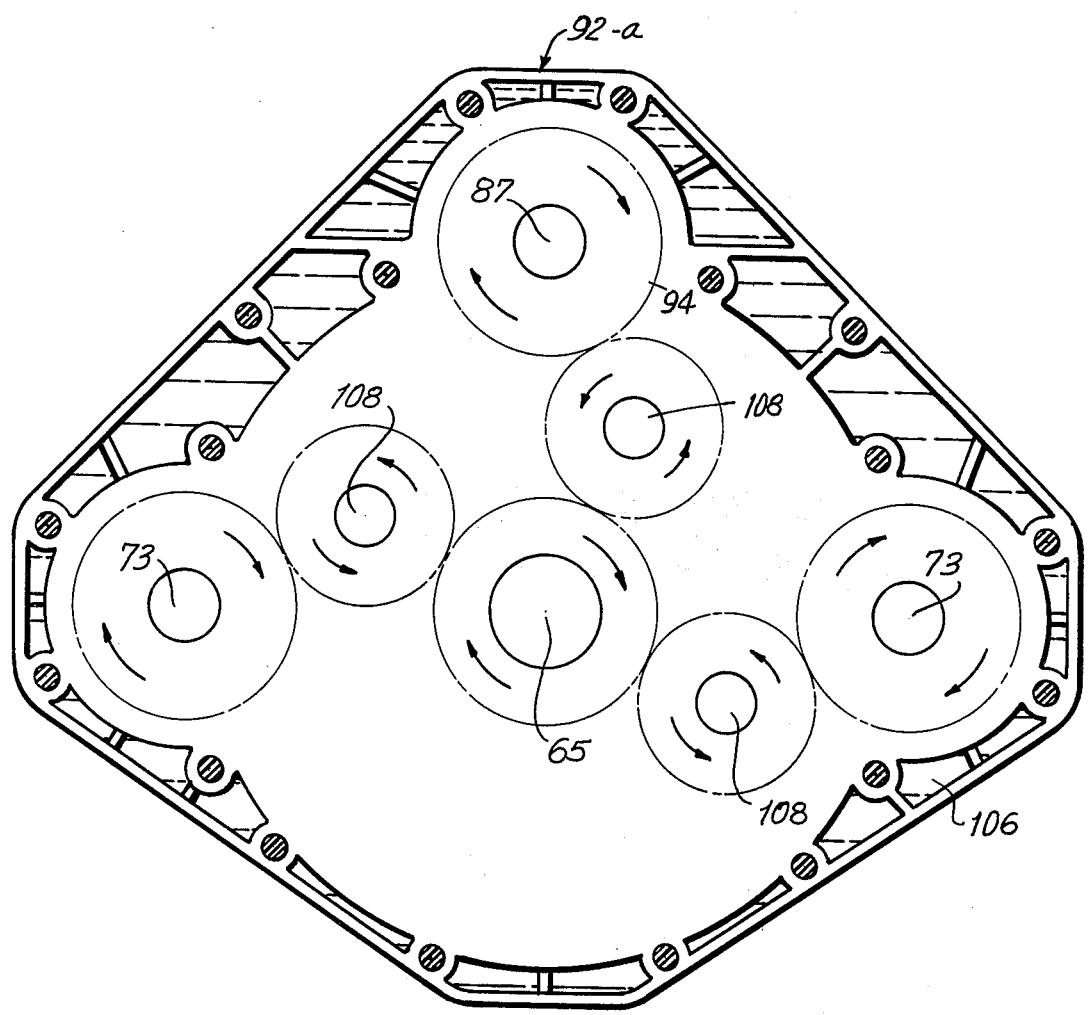

FIG. 25 shows Section B—B of FIG. 22a where a layout similar to the foregoing is repeated. In addition it indicates the injection method 102 and ignition 103 distributed on the combustion chamber. In this same FIG. 25, the rotor-valve 86 for combustion is shown in cross-section, to permit observation of the axial cooling tunnels and lubrication ducts 87a, with the radial channel 87c for lubrication of the wipers 79. The peripheral channelling 106 shows the axial cooling circulation system. The synchronization train 94 is shown in the schematic of FIG. 26.

The operation of the motor, in accordance with the present invention, is described in sequence by FIGS. 27-41 as follows:

FIG. 27: Auxiliary rotor-piston 70a begins to create the internal vacuum which produces air intake through the port 98.

FIG. 28: Filling of the first intake chamber proceeds while port 98 is covered gradually by intake valve 72a.

FIG. 29: By-pass valve 72b uncovers the entrance to transfer tunnel 101 through which air passes toward the rotor-piston 70 compression chamber.

FIG. 30: Intake valve 72a has closed port 98, terminating the first stroke corresponding to "Intake". In this interval, observation may be had of the function of the cooling air which is taken in through port 107 and is ejected through port 107'.

FIG. 31: The auxiliary rotor-piston almost completes the transfer of air while the rotor piston begins compression in housing 88b.

Figure 32:
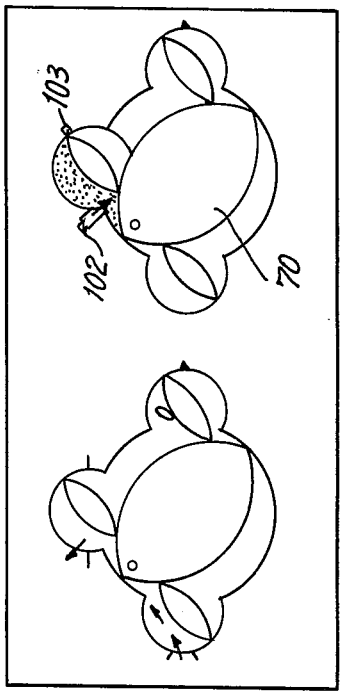

FIG. 32: By the indicated arrow, the fraction of air taken in which will be recirculated by by-pass valve 72b, is seen flowing in the direction of the thermal reaction chamber to feed the post-combustion process of the foregoing cycle.

Figure 33:
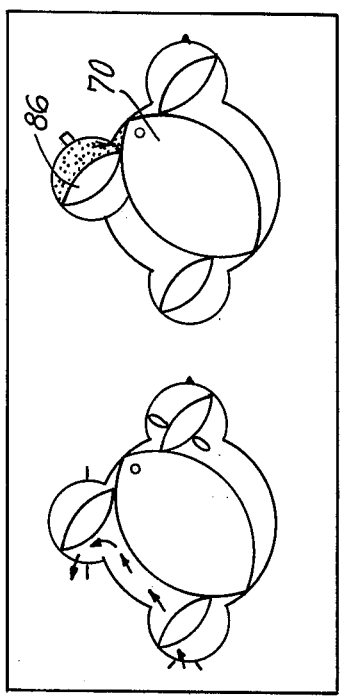

FIG. 33: The rotor-piston 70 is at the point of concluding the second stroke corresponding to the compression part of the cycle.

Figure 34:
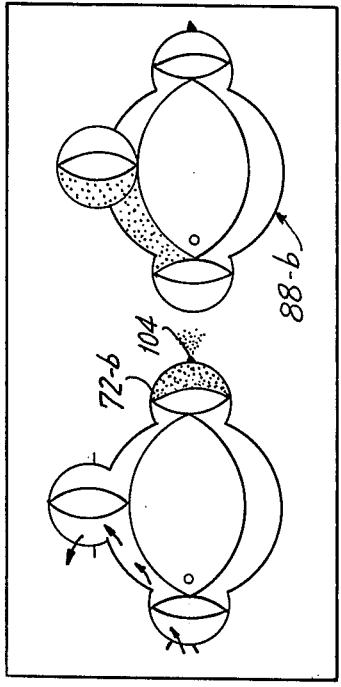

FIG. 34: This graphic presentation demonstrates one instant in the compression process which is accomplished at constant volume and takes place at the incandescent filament of igniter 103. This part of the cycle corresponds to combustion.

Figure 35:
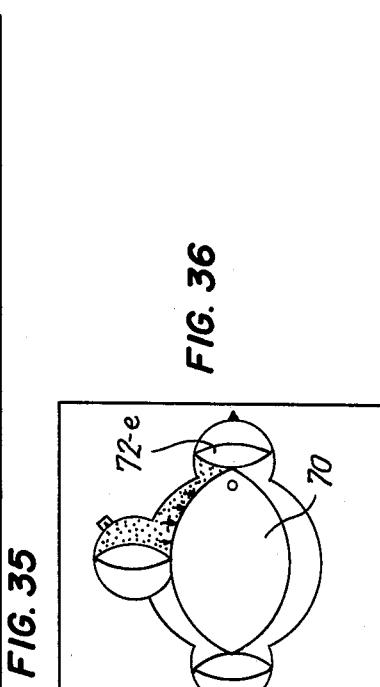

FIG. 35: Expansion is initiated on rotor-piston 70.

Figure 36:
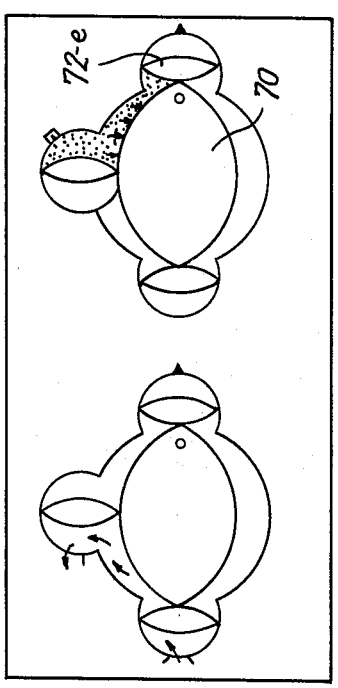

FIG. 36: The expansion covers all of rotor-piston 70 and also acts on by-pass valve 72e before it uncovers the adiabatic tunnel, whose intake orifice is shown in FIG. 37.

Figure 37:
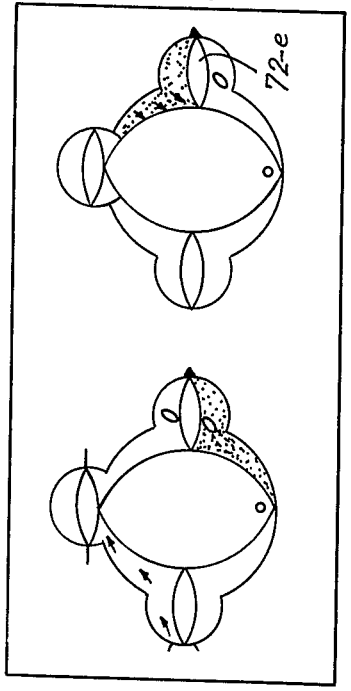

FIG. 37: Through the adiabatic tunnel (indicated as traced over housing 88b) the incandescent gases are taken in toward the post-combustion chamber of housing 97, through the hole 100.

Figure 38:
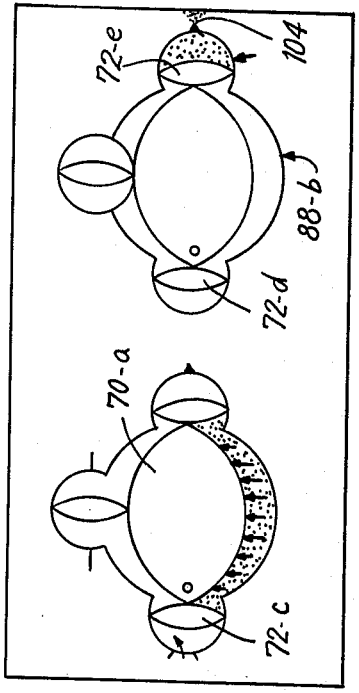

FIG. 38: Post-combustion is accomplished in spontaneous form when penetrating the jet-stream, at high speed, of incandescent gases through an oxygen-enriched air mass.

Figure 39:
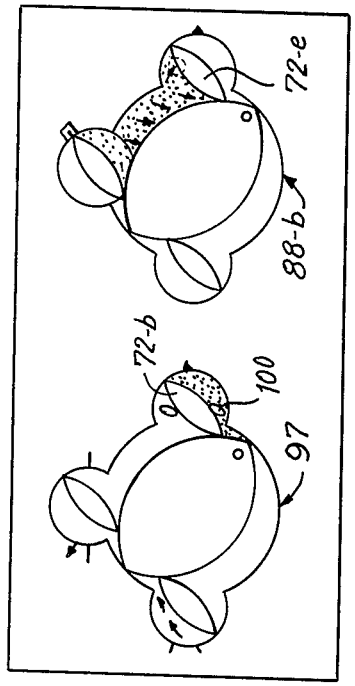

FIG. 39: Expansion continues on rotor-piston 70a while incandescent gas flows from housing 88b, expelled by rotor-piston 70.

Figure 40:
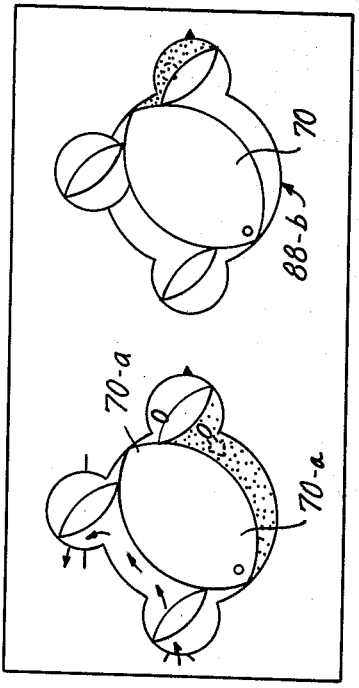

FIG. 40: In this phase, expansion has ceased and in housing 88b 72e traps the 1st fraction of first expansion gases, which has already commenced to cool. This fraction, when expanding under rotor-piston 70 cools rapidly with the rotor itself serving as a coolant. It is then compressed and confined behind valve 72d, to be recirculated toward the combustion chamber where it acts as an oxygen reducer to lower the combustion temperature. This stage marks the end of the fourth stroke corresponding to the expansion part of the cycle.

Figure 41:
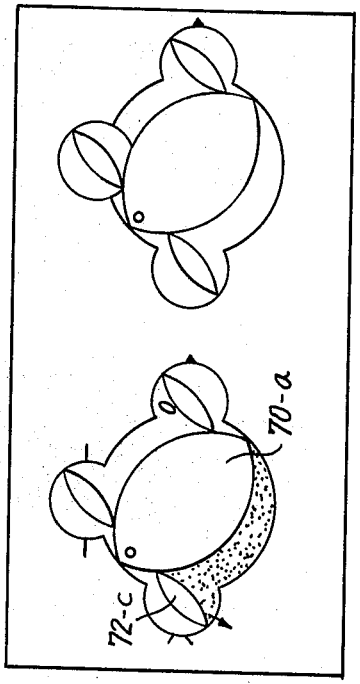

FIG. 41: The auxiliary rotor-piston 70a sweeps toward the outside all residual products (the ventilator 95 is not represented here), terminating the fifth stroke corresponding to the exhaust part of the cycle.

Figure 42:
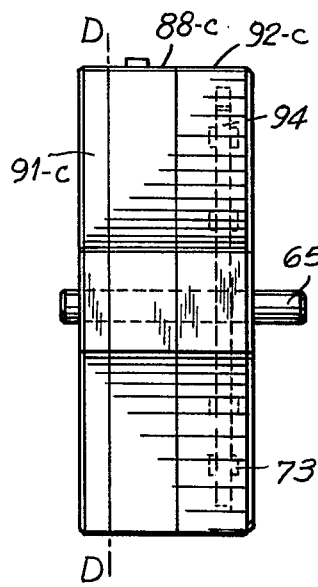
FIG. 42 is a side view of the internal combustion engine with total expansion.
Figure 43:
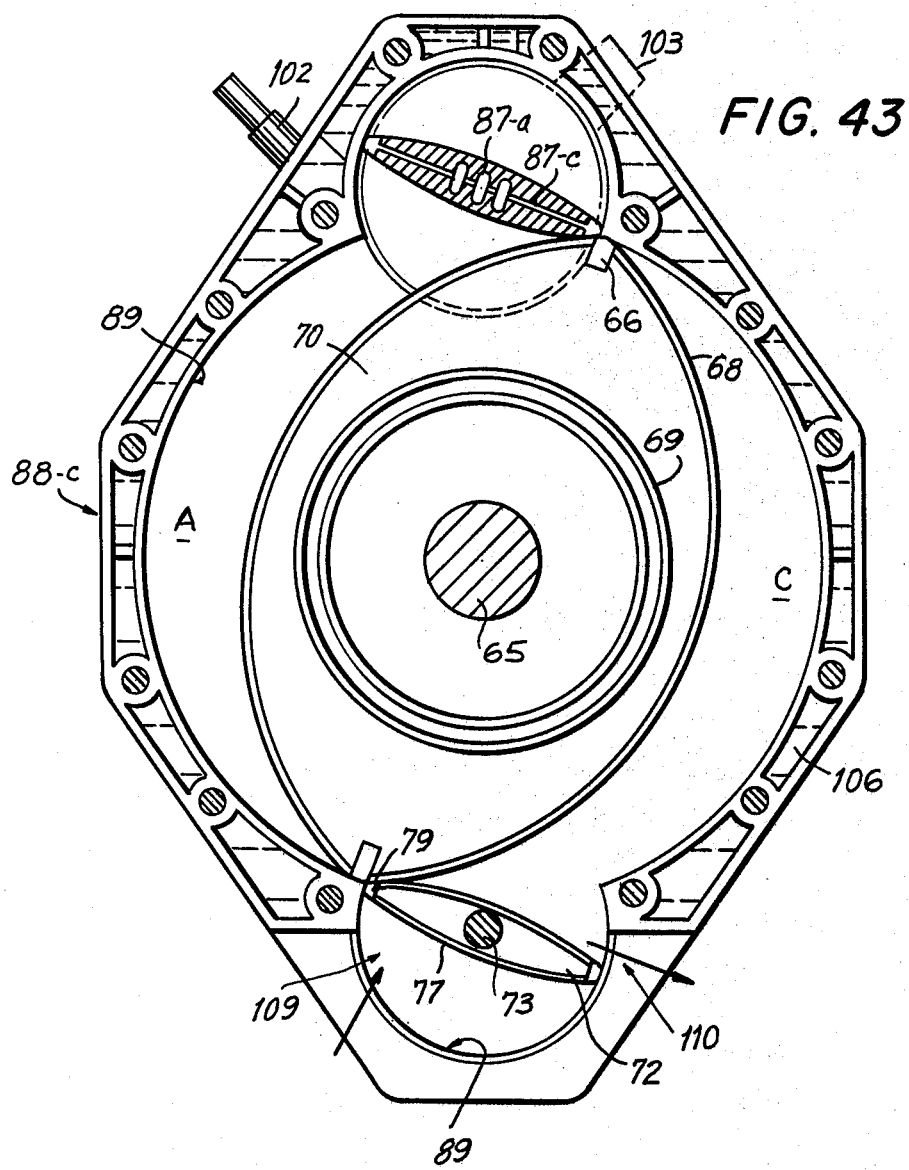
FIG. 43 is a sectional view taken along line D—D in FIG. 42.

With the arrangement shown in FIGS. 42 and 43, a constant volume internal combustion engine is obtained, highly simplified, and composed basically of stator 88c, closed on both sides by housings 91c and 92c which serve as friction surfaces for seals 66 and 79, segments 68 and 77 and the rings 69 to hermetically seal the compression chambers A, combustion chambers B and expansion chambers C.

The operating characteristics of this motor of simplified normal expansion, are similar to those of the total expansion motor previously described. Here the rotor-piston 70 suctions through intake 109 air which commences to be compressed in the chamber A. Compression is completed in chamber B which is the combustion chamber where, with the assistance of igniter 103, combustion is accomplished. This increases the pressure of the gases and causes the rotor-piston 70 to rotate. Once the expansion is terminated, it sweeps the gases, expelling them toward outlet 110.

Figure 44:
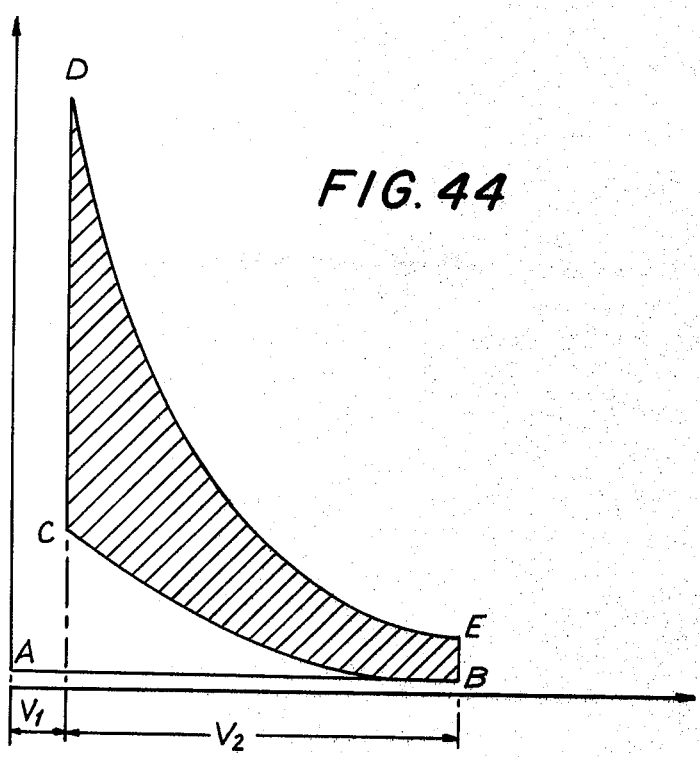
FIG. 44 is a graphical representation of the power cycle, and in particular of a five speed cycle of an internal combustion and total expansion engine of the present invention.
Figure 45:
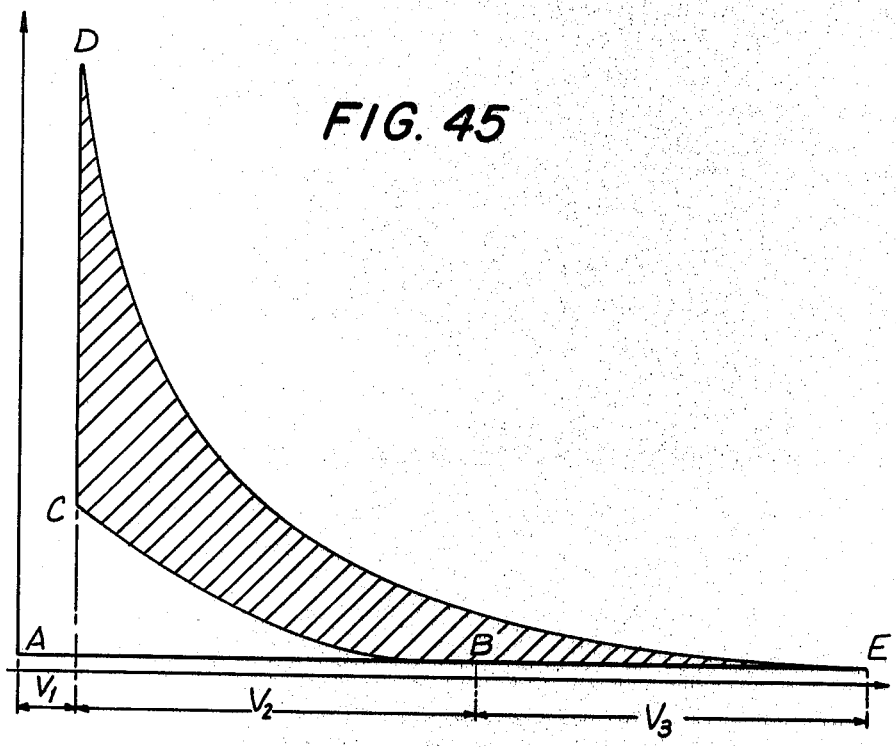
FIG. 45 is a further graphical representation of a power cycle associated with the cycle of FIG. 44.

FIGS. 44 and 45 show, respectively, graphic representations of the five strokes on a coordinated pressure-volume system for the normal and total expansion motors described above.

Figure 46:
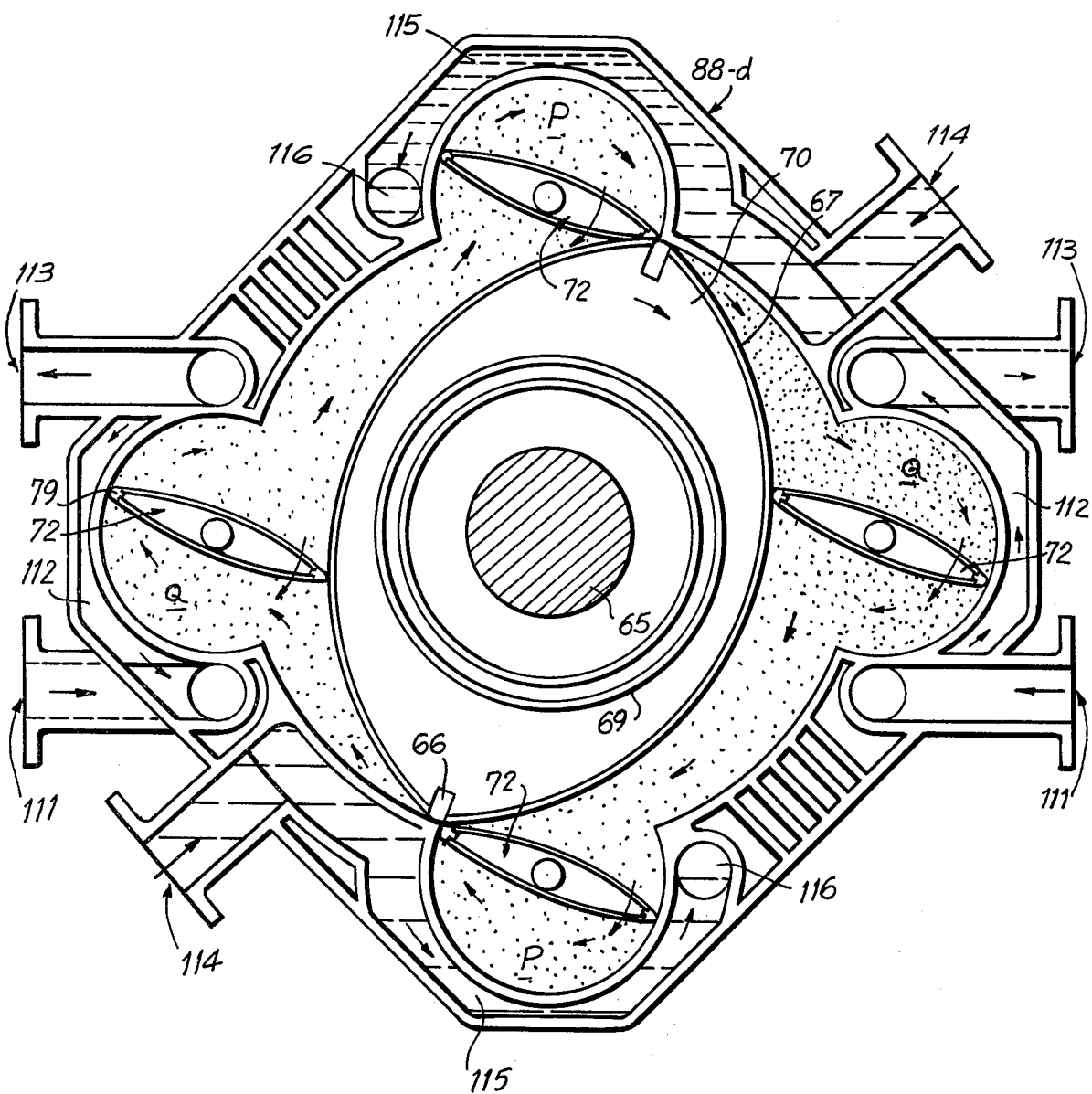
FIG. 46 is a front view of the main housing of an external combustion engine of the present invention.

FIG. 46 represents a simplified schematic of a modification of the basic machine adapted to function as an external combustion engine. Here, a gas, heated by any means whatever, either in a solar oven, any kind of burner or an atomic reactor, simultaneously penetrates through two intakes 111, symmetrically arranged on stator 88d. The gas surrounds the heat absorption chambers Q circulating through the tunnel 112 to be ejected, once the transfer of heat has been effected, through the outlets 113. The rotors moved initially by any kind of device coupled to the output shaft, are rotated later by the successive expansions of the inside gas hermetically enclosed at high pressure. The cooling of the interior gas is accomplished in the opposite chambers P, which evacuate the heat by the transfer method toward the cooling fluid which circulates through the tunnels 115 from the intake 114 to the outlet 116. For better comprehension of the thermodynamic process which the interior gas undergoes (helium or hydrogen), an explanation of the operation is provided through the graphic sequence of FIGS. 47 to 56.

FIG. 47: The schematic shows the initial instant when the gas, strongly compressed, is at the same pressure in all chambers.

FIG. 48: The heat supply commences and when the gas contained in absorption chamber Q acquires the necessary temperature, the staring mechanism is lightly activated and the expansion is initiated. This sustains the movement of the system until it rapidly acquires the multiplicity of regular pressures and temperatures in the different chambers.

FIG. 49: The gas now, with the maximum operating temperature, begins to expand over rotor-piston 70 and produces work. The simultaneous events taking place in the opposite chambers should be noted.

FIG. 50: Torque is produced by the action of two forces which are the product of simultaneous expansion.

FIG. 51: Expansion is completed and compression is about to begin, in the direction of the opposite chambers P.

FIG. 52: The gas is pushed toward the heat expulsion chamber P, as it begins to cool.

FIG. 53: In the expulsion chamber P, it is totally compressed under strong refrigeration, lowering its temperature even more.

FIG. 54: The cooling process is accomplished at constant volume while the temperature of the gas continues to be lowered.

FIG. 55: The gas now expands, delivering some work while its temperature continues to decrease, even more.

FIG. 56: The almost totally expanded gas, at its lowest temperature, now commences to receive heat in the chamber Q and is ready for compression with heat absorption in order to begin again the cycle.

A cycle has been carried out as represented in FIG. 57 by a pressure-volume graph. The areas represent work force in kilograms, where the squared area is the work delivered by the cycle and the dotted area is the work absorbed by the cycle.

FIG. 58 represents the cycle in a temperature-entropy graph, where the work is expressed in calories, with the squared area also being the work delivered by the cycle and the dotted area represents the work consumed.

The processes in the cycle are traced as follows:
1-2: Heat absorption at constant volume.
2-3: Adiabatic expansion.
3-4: Compression at constant pressure.
4-5: Heat rejection at constant volume.
5-6: Adiabatic expansion.
6-1: Compression with heat expansion.

Figure 59:
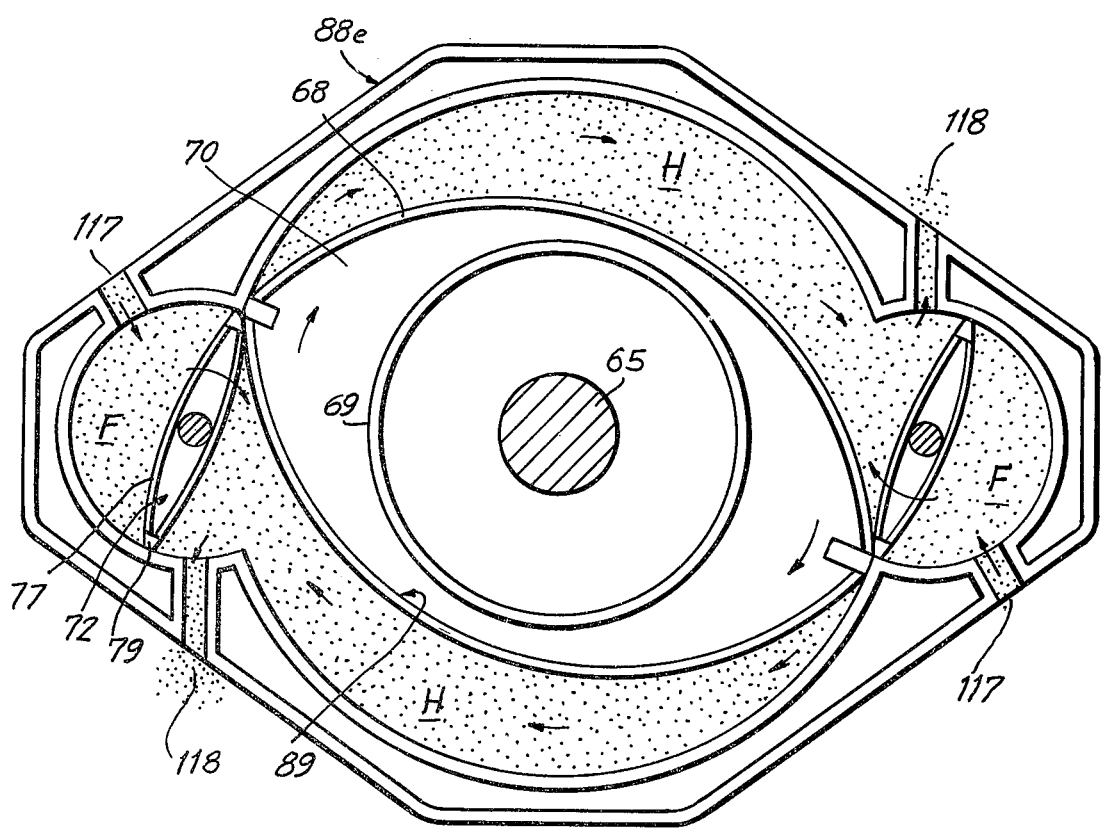
FIG. 59 is a front view of a fluid motor of the present invention.

The descriptions provided up to this point cover internal and external combustion engines. However, the scope of the invention in motorized machines also covers compressed vapor and compressed air expansion motors, including hydraulic motors. FIG. 59 represents schematically a fluid motor, based completely on an adaptation of the basic machine referred to above. The fluid motor or expansion machine shown in FIG. 59 includes the moving parts, stator and covers described previously, and utilized n such a way that now the symmetrically opposite chambers F receive discreet portions of motor fluid at predetermined pressure through the intakes 117 in the interval during which these chambers maintain their constant volume. If the machine is not in motion a slight angular displacement causes the motor fluid to act on the rotor-piston 70, causing it to rotate. Once the fluid has delivered its energy, it is exhausted through the ports 118. The stresses on the machine's shaft are compensated by the action of the opposite chambers H.

Figure 59A:
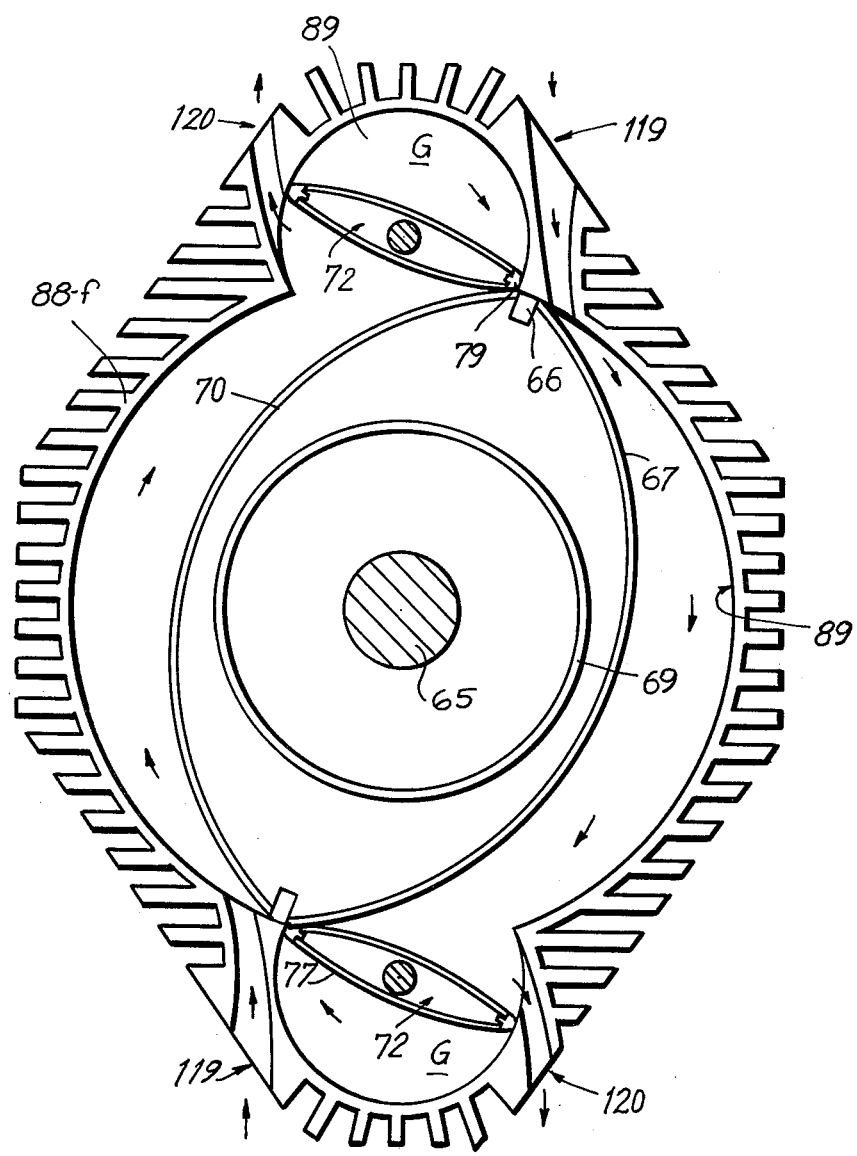
FIG. 59a is a front view and shows a volumetric pump, in accordance with the present invention.

FIG. 59a represents a simplified schematic of the basic machine adapted for operation as a positive displacement pump, including different uses such as: compressors, vacuum pumps, blowers and pumps for liquids and semi-liquids.

The pump shown in said FIG. 59a consists of a stator 88f, with cooling fins (compressors and vacuum pumps) and has intakes 119 and outlets 120 for the intake and expulsion of the fluids to be processed. The symmetrical chambers G will recirculate, always, a portion of the substance (white arrows) as the reciprocating machines do with the volume of the dead space.

The operation of the pump is substantially simple: it takes advantage of the unidirectional dynamic effect (indicated with black arrows of the fluid during the intake period, and adding it to the impulse effect created by the rotor-piston 70. The machine gives a double action result, with identical diametrical forces acting on the shaft 65.

Figure 60:
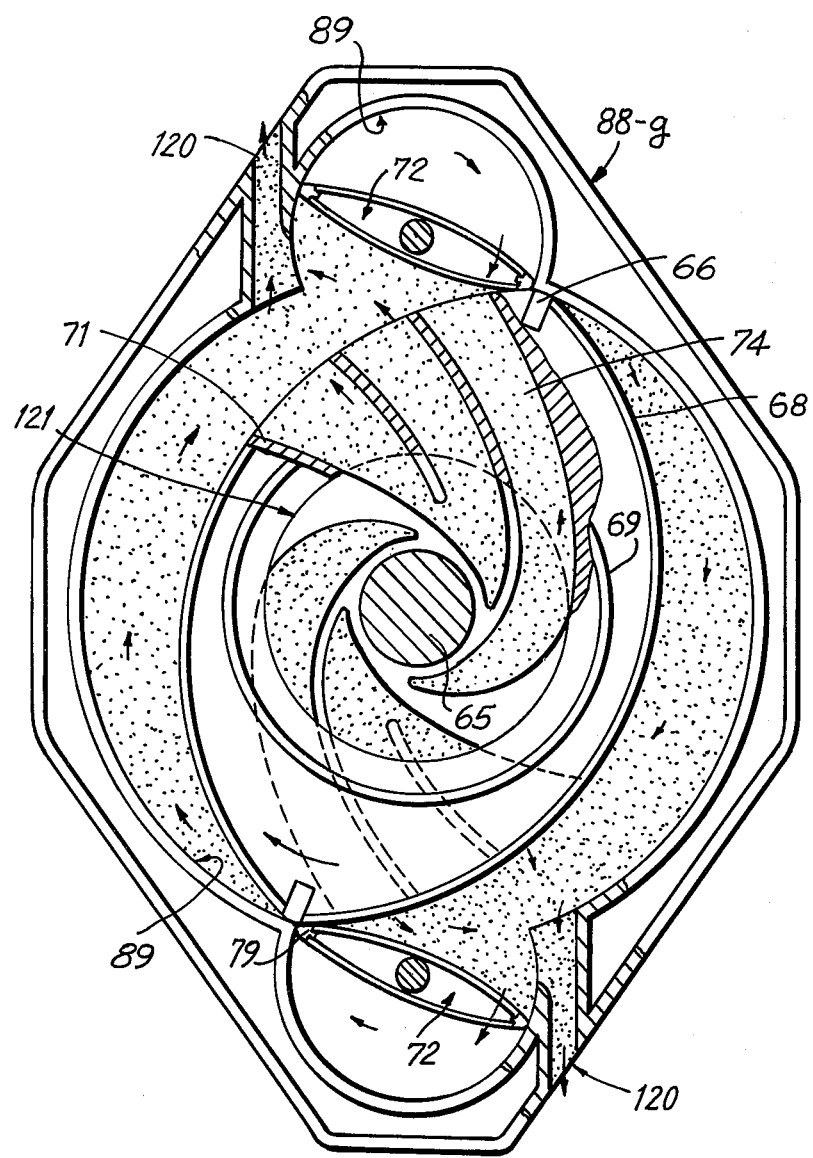
FIG. 60 is a front view and shows a mixed displacement pump, in accordance with the present invention.

FIG. 60 shows a variant of the above-described pump with the replacement of rotor-piston 70 with rotor-piston impeller 71 which is provided with suction ring 121 that communicates with the interior chambers of the pump by means of voluted tunnels 74.

In operation of the mixed displacement pump, when the rotor-piston impeller 71 rotates, a vacuum is created in the annular suction mouth 121, as a result of which the pressure is less than atmospheric pressure. The fluid enters axially due to that pressure differential and then is tilted radially when passing the volutes 74.

The graphic sequence of FIGS. 60a and 60b describe the double function of the impeller rotor-piston, in the following form: FIG. 60a demonstrates an instant in which the pump housing commences filling up at the expense of the dynamic rotation effect of impeller 71 which, when creating a vacuum in its fast spin, suctions the fluid and discharges it through the volutes 74. At the same time, such an acceleration pressure is exerted on the particles that they achieve rotor speed and move parallel to it in the direction of rotation as shown in FIG. 60b. The aspirated fluid transforms, upon leaving the volute, its load at pressure speed. FIG. 60c indicates the expulsion of the fluid through the symmetrical ports 120. FIGS. 60d, 60e, and 60f show the rotor-piston 71 increasing the pressure of the fluid at the expense of only the volumetric effect.

In this pump, also, a system of compensated stress is added to the double effect. This is the product of the double symmetry, and furnishes a practically constant discharge.

This principle of operation, is based on elements which rotate at a very high rate of pure spin, generated in such a way that they can achieve an infinite range of compression ratios. They also have the possibility of operating with such compensation and balance that the larger rotor would perform like a flywheel, making the device ideally suited to obtain pressures of a magnitude.

Figure 61:
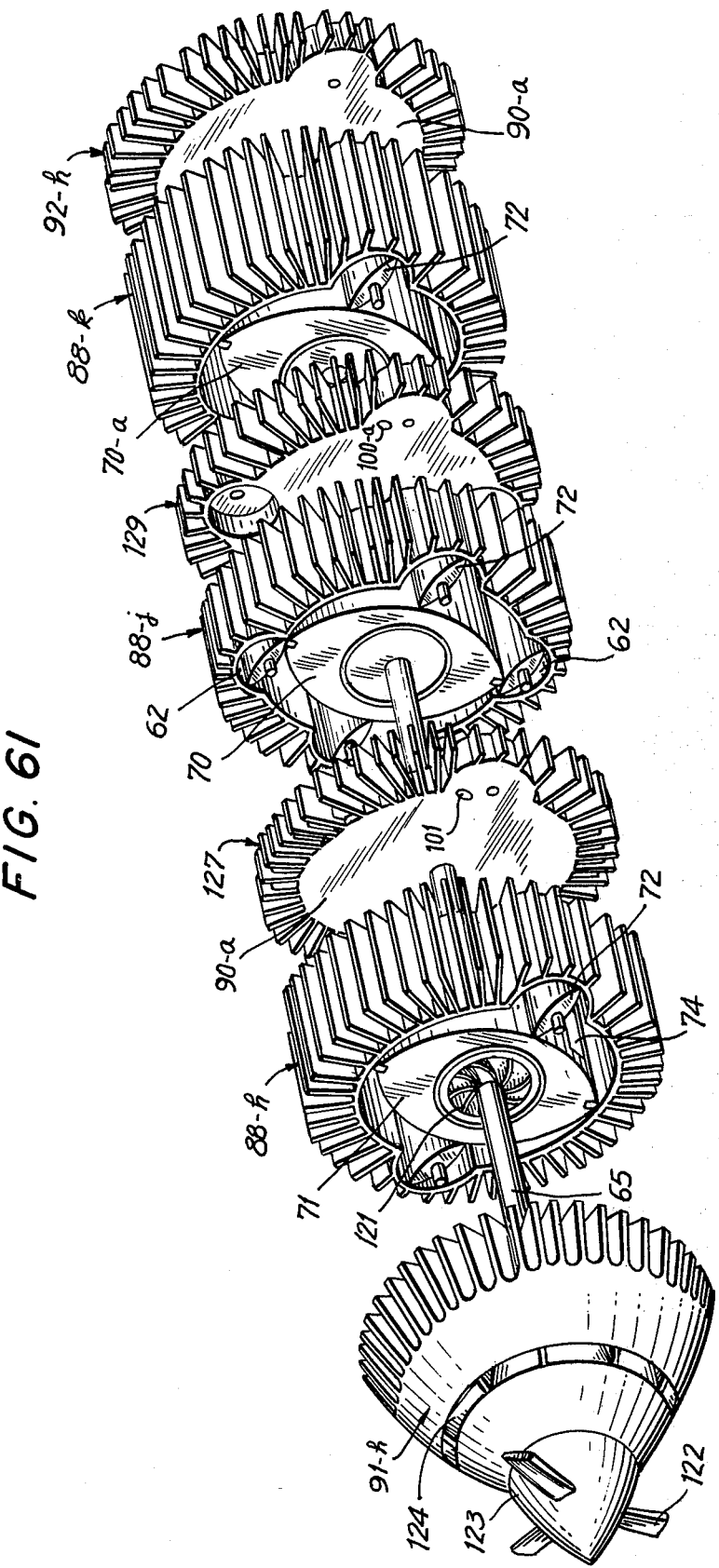
FIG. 61 is an exploded view of an internal combustion engine in accordance with the present invention, used for aviation purposes.

Also, with the basic machine, and the layout envisioned in FIG. 61, a double effect motor is obtained, which is air-cooled, and offers a fusilated structure suitable for installation in the wings of aircraft.

As shown in FIG. 61, the aforementioned motor consists of three housings or stators, 88h, 88j, and 88k of different thicknesses, and separated by the bulkheads 127 and 129. The conical housing 91h forms the assembly joint, with annular intake 124 and propeller-holder 123. The rear end is closed by cover 92h.

Figure 61A:
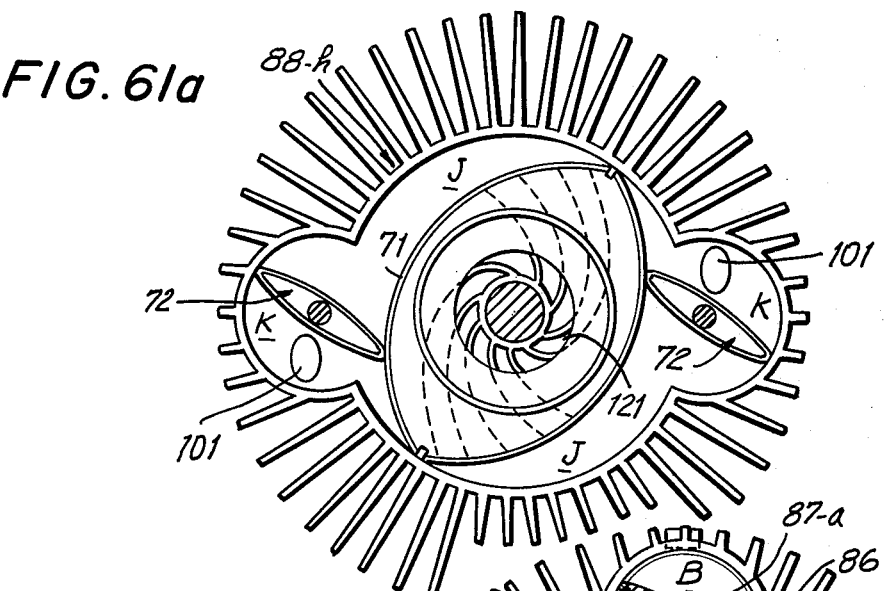
FIG. 61a is a sectional view of the compressor housing of the engine of FIG. 61.

The first stator 88h, which operates solely in the capacity of a compressor, houses impeller rotor-piston 71. (FIG. 61a) Axial suction 121 of the air comes from intake 124. This impeller rotor-piston 71, in coordination with the rotor-valves 72 exert compression pressure on the aspirated air which passes through intakes 101 toward the chambers A of the combustion stator 88j of FIG. 61b. The rotor-piston 70 introduces the load into the summetrical combustion chambers B which, after combustion, undergoes the first expansion process on the rotor-piston 70 itself. The gases are expelled through the openings 100a and, passing through the bulkhead 129, reach the housing 88k where they expand on the expander rotor-piston 70a in the chambers L of FIG. 61c. They are then expelled through the exhaust ducts 132. All of the above-mentioned rotors: 70, 70a and 71 are mounted on the same shaft 65, FIG. 61, delivering power to the propeller 122 through the reducer (not shown).

Figure 61B:
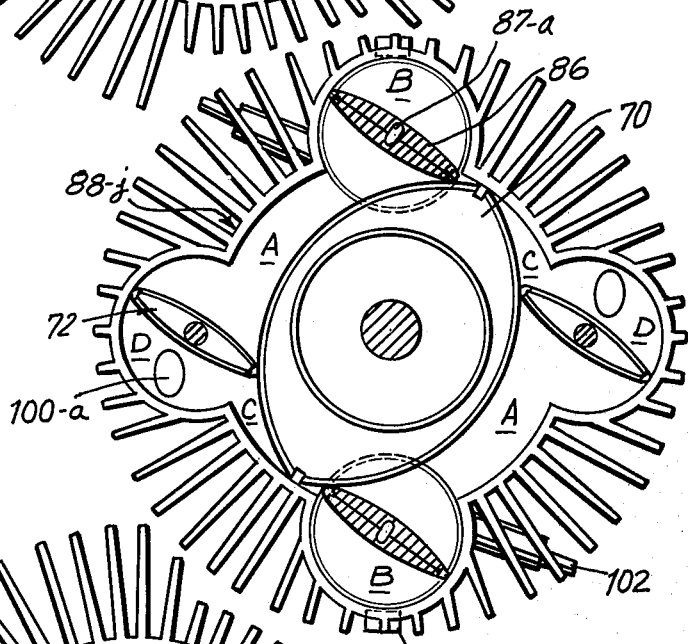
FIG. 61b is a sectional view of the motor housing of the engine of FIG. 61.
Figure 61C:
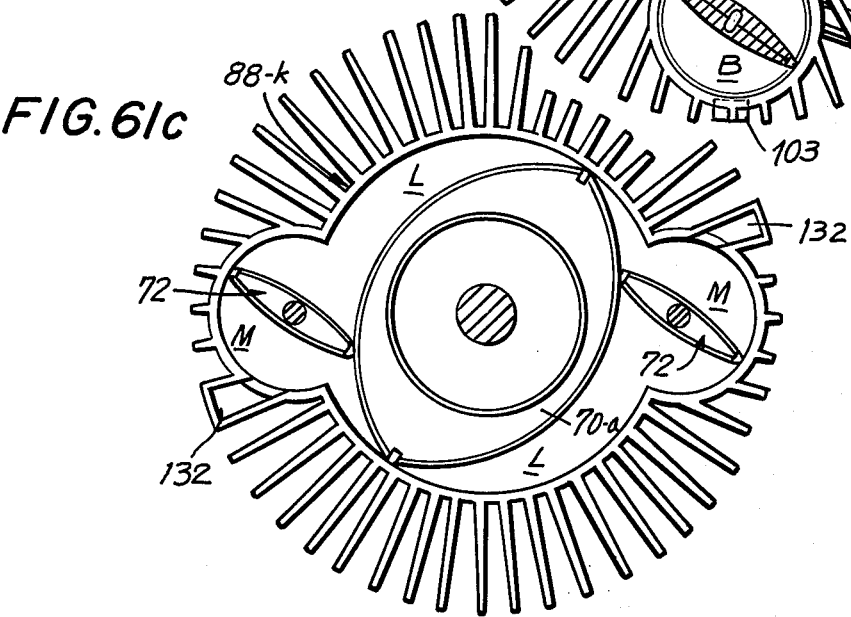
FIG. 61c is a sectional view of the expansion housing of the engine of FIG. 61.

Since the compression ratio is variable, with respect to motor revolutions, and aircraft speed, the quantity of fuel supplied by the injectors 102, FIG. 61b, will vary in the direction of a greater rate of economy, according to power capacity requirements.

The energy charged gases expand simultaneously in diametrically opposite chambers C, creating a powerful torque on rotor-piston 70. In addition to avoiding lateral stresses on the bearings, rotor 70 compresses the air of the opposite chambers C, making it possible for the effective output power to act solely through the shaft.

The gases which expand on the rotor-piston 70 produce a similar effect, creating another pwerful torque on the motor shaft which accumulates its effect, due to its simultaneous action, on the torque described above on the rotor-piston 70.

Figure 62:
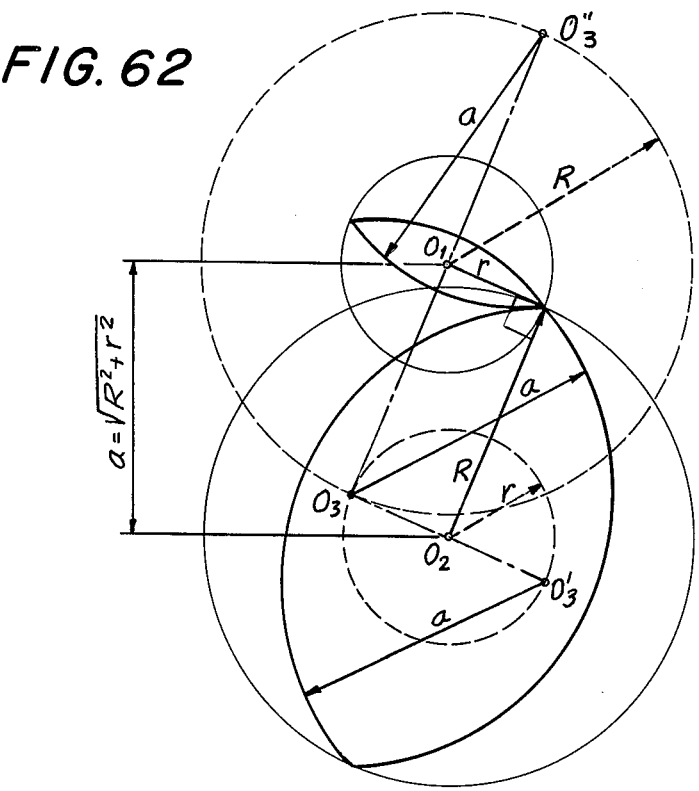
FIG. 62 is a geometrical view and shows the construction of the basic lenticular shapes, in accordance with the present invention.
Figure 62A:
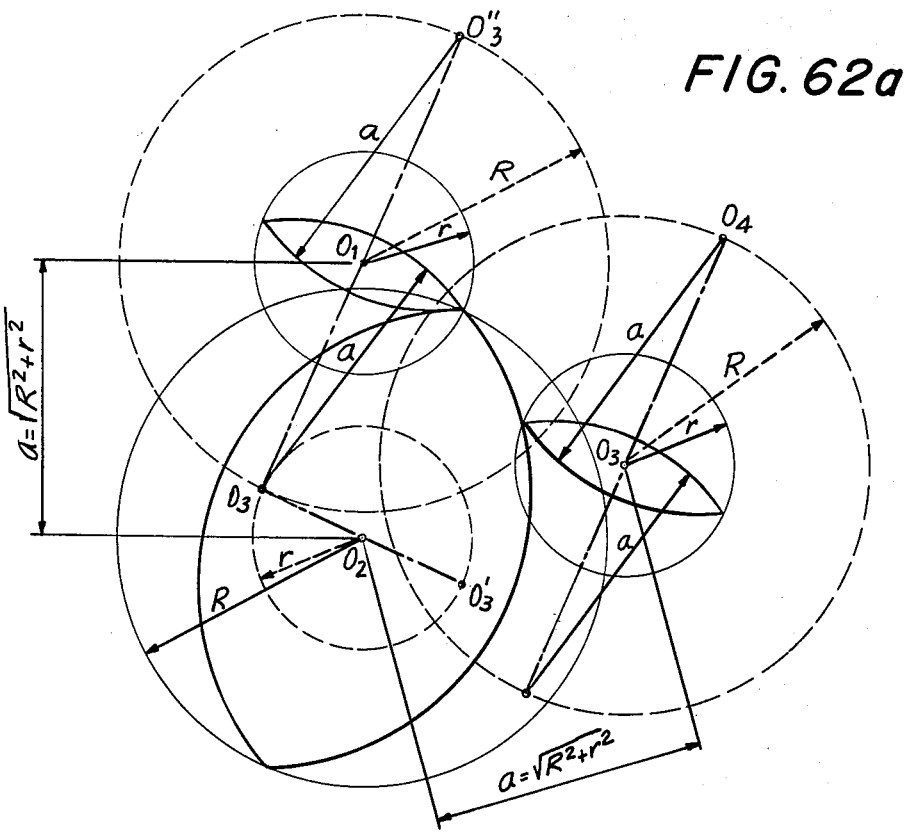
FIG. 62a is a geometric view and shows the construction of general lenticular shapes.

All of the machines referred to in this invention have been designed on the basis of the geometrical schematics shown in FIGS. 62 and 62a where, on the basis of two parameters, minor radius "r" and major radius "R" of the two orthoganal circumferences, the ratios are obtained between rotors 70 and 72 together with interior surfaces 89 of the different stators used.

FIG. 62 shows the geometrical construction, and primary concept originated by the theorem described supra and may be stated as follows: selecting two arbitrary circumferences with radii "r" and "R" with centers 01 and 02 respectively, the Pythagorean Theorem is employed to find the distance between centers "a".

With the center at 01, the circumference is traced for radius R and with the center at 02, the circumference of radius r is drawn. The point at which both circumferences intersect, 03, will serve as a center to describe a circumferential arc of radius "a", inside the original circumferences.

Then, the points diametrically opposite to 03 on each circumference of lines 03/ and 03", serve as centers to trace two arcs of radius "a" which complete the two lenticular configurations.

The geometrical schematic construction of the paired lenticular configurations can be generalized to form additional lenticular configurations, as shown in FIG. 62a, simply observing the distance between centers "a" extended now from point 02 to point 01'. On the diameter 04-04', parallel to 03-03", the radius "a" arcs are drawn which form the new lenticular configuration. In this manner, as many lenticular shapes of minor category can be drawn as physically possible, in accordance with the "r" and "R" ratio.

It is to be understood that the machines described above and covered by the scope of this invention, are not limited solely to the construction and arrangements shown in the schematics, and that both factors can be amply modified pursuant to the operating principle explained.

Without further analysis, the foregoing will so fully reveal the gist of the present invention that others can, by applying current knowledge, readily adapt it for various applications without omitting features that from the standpoint of prior art, fairly constitute essential characteristics of the generic or specific aspects of this invention, and therefore, such adaptations should and are intended to be comprehended within the meaning and range of equivalence of the following claims.

I claim:

1. A machine with rotating lenticular pistons and valves for internal and external combustion engines, expansion motors and pumps, comprising a flat central stator housing with two lateral cover housings, a plurality of rotating elements enclosing the interior of said stator housing and rotating on stationary parallel shafts pivoted on bearings inside said cover housings, gear train means connecting said parallel shafts for producing rotation of said parallel shafts in one direction and at the same angular speed, said central stator housing containing in its interior and throughout its entire thickness, a cylindrical central cavity coaxially intersected by a plurality of cylindrical smaller equidistant surfaces distributed around its periphery and rotating inside said central cylindrical cavity, a rotor-piston with lenticular cross-section, a plurality of rotor-valves also of lenticular cross-section and surrounding said rotor-piston, said rotor valves rotating and making contact with said smaller cylindrical surfaces, said cylindrical equidistant surfaces contacting said cavity by said rotor-piston, said rotor-valves having seal means shaped in correspondence to the profiles of the lenticular surfaces of said rotor-valves, said rotor-piston and rotor valves maintaining continuous contact for forming hermetic chambers of variable volumes, three sandwiched housings, said stator housing being enclosed on both sides by two covers, said stator housing having two outlet ducts communicating with an interior central cavity of said stator housing, said interior cavity being formed by the intersection of two cylindrical surfaces of substantially identical diameter and distributed symmetrically about a central cylindrical surface substantially of larger diameter, three rotors of lenticular cross-section rotating within said three cylindrical surfaces and generated by a single common circumferential curve, said rotors having sealing means, said rotor-piston rotating within the larger cylindrical surface and having channels formed by spiral volumes communicating with the chambers within said stator housing, said channels communicating with the exterior through an annular intake distributed about said shaft, said rotor sealing means comprising: first auxiliary sealing means of a plurality of arc-shaped members conforming to the surface of said rotor-piston with lenticular cross-section and wave-shaped spring means between said arc-shaped members and said rotor-piston, said second auxiliary sealing means with two sheets forming flat face plates in channels along lines of contact with said rotor valves, auxiliary spring means in said channels and urging said face plates against said lines of contact with said rotor valves, said plates having means for the flow of lubricating oil, said rotor-piston having interior channels for circulation of cooling fluid, cooling fin means on said stator housing, suction ring means on said rotor-piston and communicating with said chambers through said spiral volutes, the profiles of said rotors are geometrically formed by the election of two arbitrary surface circumferences orthoganally intersected, the circumscription of said two circumferences extending so that the circumference of greater diameter is circumscribed over the smaller one in an unbroken line, the smaller traced line being inscribed within the larger continuous unbroken line circumference, four circumferential arcs with radius equal to the pistons between centers being traced from a center in the intersection point of both traced circumferences and from the diametrically opposite points on the traced circumferences, so that two lenticular configurations are formed in contact by one of their points within the original circumferences, other lenticular configurations being added to the pair drawn by repeating one of them, angular displacement of the major axis of the lenticular configurations forming helicoid rotors with curved surfaces for blades.

* * * * *